(12) United States Patent
Takechi

(10) Patent No.: US 8,355,146 B2
(45) Date of Patent: Jan. 15, 2013

(54) IMAGE FORMING APPARATUS AND IMAGE FORMING SYSTEM

(75) Inventor: Ken Takechi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 465 days.

(21) Appl. No.: 12/755,833

(22) Filed: Apr. 7, 2010

(65) Prior Publication Data

US 2010/0265530 A1    Oct. 21, 2010

(30) Foreign Application Priority Data

Apr. 16, 2009    (JP) .................. 2009-100151

(51) Int. Cl.
*G06F 3/12* (2006.01)
*G06K 15/00* (2006.01)
*H04N 1/40* (2006.01)
*H04N 1/00* (2006.01)

(52) U.S. Cl. ............ 358/1.14; 358/1.16; 358/3.23; 358/426.05; 399/10

(58) Field of Classification Search .......... None
See application file for complete search history.

(56) References Cited

U.S. PATENT DOCUMENTS 6,202,092 B1 * 3/2001 Takimoto ............... 709/225
2008/0204793 A1 * 8/2008 Shaw ..................... 358/1.15

FOREIGN PATENT DOCUMENTS

JP    2004-249625 A    9/2004

* cited by examiner

*Primary Examiner* — Thomas Lett
(74) *Attorney, Agent, or Firm* — Marvin A. Motsenbocker; Mots Law, PLLC

(57) ABSTRACT

An image forming apparatus includes: an image forming unit configured to form images based on image data transmitted from information processing apparatus of users including registered users and unregistered users; a setting unit configured to set permission information for each user based on a log of the image forming and limit information; a first judging unit configured to determine whether user identification information is attached to image data; a second judging unit configured to determine, based on the permission information that is set for an unregistered user, whether to permit execution of image forming of the image data, when the first judging unit determines that the user identification information is not attached to the image data.

20 Claims, 19 Drawing Sheets

FIG. 3A

| PIN | PERMISSION INFORMATION |
|---|---|
| 0 | ON |
| 1 | ON |
| 2 | OFF |
| . | . |
| . | . |
| . | . |
| 100 | ON |
| . | . |
| . | . |
| . | . |

FIG. 3B

| PIN | PERMISSION INFORMATION |
|---|---|
| 0 | OFF |
| 1 | ON |
| 2 | OFF |
| . | . |
| . | . |
| . | . |
| 100 | ON |
| . | . |
| . | . |
| . | . |

FIG. 4

| PIN | PRINTED AMOUNT |
|---|---|
| 100 | 22 |
| 0 | 8 |
| ⋄ | ⋄ |
| ⋆ | ⋆ |
| ⋄ | ⋄ |

FIG. 5A

| PIN | LIMIT AMOUNT | PERMISSION INFORMATION |
|---|---|---|
| 0 | – | ON |
| 1 | – | ON |
| 2 | 100 | OFF |
| . . . | . . . | . . . |
| 100 | 1000 | ON |
| . . . | . . . | . . . |

FIG. 5B

| PIN | LIMIT AMOUNT | PERMISSION INFORMATION |
|---|---|---|
| 0 | 10 | ON |
| 1 | – | ON |
| 2 | 100 | OFF |
| . . . | . . . | . . . |
| 100 | 1000 | ON |
| . . . | . . . | . . . |

FIG. 5C

| PIN | LIMIT AMOUNT | PERMISSION INFORMATION |
|---|---|---|
| 0 | 10 | OFF |
| 1 | – | ON |
| 2 | 100 | OFF |
| . . . | . . . | . . . |
| 100 | 1000 | ON |
| . . . | . . . | . . . |

FIG. 6A

| PIN | TOTAL PRINTED AMOUNT |
|---|---|
| 0 | 2 |
| 1 | 0 |
| 2 | 100 |
| . | . |
| . | . |
| . | . |
| 100 | 10 |
| . | . |
| . | . |
| . | . |

FIG. 6B

| PIN | TOTAL PRINTED AMOUNT |
|---|---|
| 0 | 10 |
| 1 | 0 |
| 2 | 100 |
| . | . |
| . | . |
| . | . |
| 100 | 32 |
| . | . |
| . | . |
| . | . |

FIG. 13A

| PIN | PC NAME | PERMISSION INFORMATION |
|---|---|---|
| 0 | – | ON |
| 1 | PC1 | ON |
| 2 | PC2 | OFF |
| . | . | . |
| . | . | . |
| . | . | . |
| 100 | PC100 | ON |
| . | . | . |
| . | . | . |
| . | . | . |

FIG. 13B

| PIN | PC NAME | PERMISSION INFORMATION |
|---|---|---|
| 0 | – | ON |
| 1 | PC0 | ON |
| 2 | PC1 | ON |
| . | PC2 | OFF |
| . | . | . |
| . | . | . |
| 100 | PC100 | ON |
| . | . | . |
| . | . | . |
| . | . | . |

FIG. 13C

| PIN | PC NAME | PERMISSION INFORMATION |
|---|---|---|
| 0 | – | ON |
| 1 | PC0 | OFF |
| 2 | PC1 | ON |
| . | PC2 | OFF |
| . | . | . |
| . | . | . |
| 100 | PC100 | ON |
| . | . | . |
| . | . | . |
| . | . | . |

FIG. 14

| PIN | PC NAME | PRINTED AMOUNT |
|---|---|---|
| 100 | PC100 | 22 |
| 0 | PC0 | 10 |
| . | . | . |
| . | . | . |
| . | . | . |

FIG. 15

| PIN | PC NAME | LIMIT AMOUNT |
|---|---|---|
| 0 | – | 10 |
| 1 | PC1 | – |
| 2 | PC2 | 100 |
| . | . | . |
| . | . | . |
| . | . | . |
| 100 | PC100 | 1000 |
| . | . | . |
| . | . | . |
| . | . | . |

FIG. 16A

| PIN | PC NAME | TOTAL PRINTED AMOUNT |
|---|---|---|
| 0 | - | 0 |
| 1 | PC1 | 0 |
| 2 | PC2 | 100 |
| ... | ... | ... |
| 100 | PC100 | 10 |
| ... | ... | ... |

FIG. 16B

| PIN | PC NAME | TOTAL PRINTED AMOUNT |
|---|---|---|
| 0 | - | 0 |
| 1 | PC0 | 10 |
| 2 | PC1 | 0 |
| ... | PC2 | 100 |
| 100 | PC100 | 32 |
| ... | ... | ... |

IMAGE FORMING APPARATUS AND IMAGE FORMING SYSTEM

CROSS REFERENCE TO RELATED APPLICATIONS

This application claims priority based on 35 USC 119 from prior Japanese Patent Application No. 2009-100151 filed on Apr. 16, 2009, entitled "IMAGE FORMING APPARATUS AND IMAGE FORMING SYSTEM", the entire contents of which are incorporated herein by reference.

BACKGROUND OF THE INVENTION

1. Field of the Invention

The invention relates to an image forming apparatus and an image forming system capable of setting a print limitation for each user.

2. Description of Related Art

In recent years, image forming systems that can be shared with plural users have been widely used in office environments. Such image forming systems include an image forming apparatus such as a printer, MFP (Multi-Function Peripheral) having a printer unit and a scanner unit, or the like and information processing apparatus, such as client PCs connected to the image forming apparatus via a network. In such image forming systems, the image forming apparatus prints based on print data transmitted from the information processing apparatus.

It is known that there is an image forming system that has an accounting server connected to an image forming apparatus via a network and configured to calculate usage fees based on print histories and to charge the usage fees to the users (see, for example, Japanese Patent Application Laid-Open No. 2004-249625).

In such an image forming system, the image forming apparatus has stored permit information to permit or prohibit printing corresponding to each user identification information, which identifies each user, such as a password or a personal identification number. Upon executing printing, the information processing apparatus transmits to the image forming apparatus print data to which the user identification information is attached. When receiving the print data, the image forming apparatus obtains the user identification information attached to the print data and compares the user identification information with registered permit information corresponding thereto. When determining that the print data is transmitted from a registered user who is permitted to print, the image forming apparatus executes printing based on the received print data.

The image forming apparatus creates and stores print history information including the user identification information and the number of printed sheets. The server obtains the history information from the image forming apparatus and calculates the usage fees to charge respective users.

When the image forming apparatus determines that it is a prohibited user who is not permitted to print or an unregistered user whose user identification information is not registered, the image forming apparatus does not allow execution of printing based on the received print data and cancels the printing.

SUMMARY OF THE INVENTION

In such conventional image forming systems, when an unauthorized user who is not permitted to print with the image forming apparatus or an external user who is not subject to being charged for printing needs to use the image forming apparatus, the administrator has to register the user identification information in the image forming apparatus. Further, it is troublesome that the user has to install a printer driver that adds its user identification information to print data into the information processing apparatus. Further, when the user finishes using the system, the administrator has to delete the registration of the user identification information to prohibit the user from using the image forming apparatus.

Accordingly, it is desired to have an image forming apparatus and an image forming system capable of printing based on print data from an information processing apparatus of an unregistered user without such troublesome requirements.

First Aspect

A first aspect of the invention is an image forming apparatus including: a reception unit operable to receive image data from information processing apparatus operated by users including registered and unregistered users; an image forming unit configured to form images based on the image data; a generation unit operable to generate history information showing the execution history of the image forming unit; a first storage operable to store the history information with user identification information corresponding to the history information; a second storage operable to store limit information of each user for limiting the execution of image forming by the image forming unit; a setting unit operable to set permission information for each user based on the history information and the limit information, the permission information showing whether or not to permit the execution of image forming by the image forming unit; a first judging unit operable to determine whether user identification information is attached to the image data when receiving the image data from the reception unit; a second judging unit operable to determine, based on the permission information that is set for the unregistered user, whether or not to permit execution of image forming of the image data, when the first judging unit determines that the user identification information is not attached to the image data; and a controller operable to instruct the image forming unit to execute image forming of the image data, when the second judging unit determines permission to execute image forming of the image data.

Second Aspect

A second aspect of the invention is an image forming system including: an image forming apparatus and a server. The image forming apparatus includes: a reception unit operable to receive image data from information processing apparatus operated by users including registered and unregistered users; an image forming unit configured to form images based on the image data; and a generation unit operable to generate history information showing execution history of the image forming unit. The server includes: a server acquisition unit capable of communicating with the image forming apparatus and operable to acquire user identification information and the history information from the image forming apparatus; a first storage operable to store the history information with the user identification information corresponding to the history information; a second storage operable to store limit information of each user for limiting the execution of image forming by the image forming apparatus; and a setting unit operable to set in the image forming apparatus permission information of each user based on the history information and the limit information, the permission information showing whether or not to permit the execution of image forming by the image forming apparatus. The image forming apparatus further includes: a first judging unit operable to determine whether the user identification information is attached to the image data when receiving the image data from the reception unit; a second judging unit operable to determine, based on the permission information that is set for the unregistered user, whether or not to permit execution of image forming of the image data, when the first judging unit determines that the user identification information is not attached to the image data; and a controller operable to instruct the image forming unit to execute image forming of the image data, when the second judging unit determines permission to execute image forming of the image data.

According to the aspects, the limit information for the unregistered user is previously set. When no user identification information is attached to the received image data, it is determined that the image data was transmitted from the information processing apparatus of the unregistered user and execution of image forming is permitted within the range of the limit information set for the unregistered user. Therefore, the external user (the unregistered user) can temporarily and conveniently use the image forming apparatus.

BRIEF DESCRIPTION OF THE DRAWINGS

FIG. 3 is an explanatory view of a configuration of a user information storage according to the first embodiment.

FIG. 4 is an explanatory view of a configuration of a print log storage according to the first embodiment.

FIGS. 5A, 5B, and 5C are explanatory views showing a configuration of a limit amount storage according to the first embodiment.

FIGS. 6A and 6B are explanatory views showing a configuration of a total printed amount storage according to the first embodiment.

FIGS. 13A, 13B, and 13C are explanatory views showing a configuration of a user information storage according to the second embodiment.

FIG. 14 is an explanatory view of a configuration of a print log storage according to the second embodiment.

FIG. 15 is an explanatory view of a configuration of a limit amount storage according to the second embodiment.

FIG. 16 is an explanatory view of a configuration of a total printed amount storage according to the second embodiment of the invention.

DETAILED DESCRIPTION OF THE EMBODIMENTS

Figure 1:
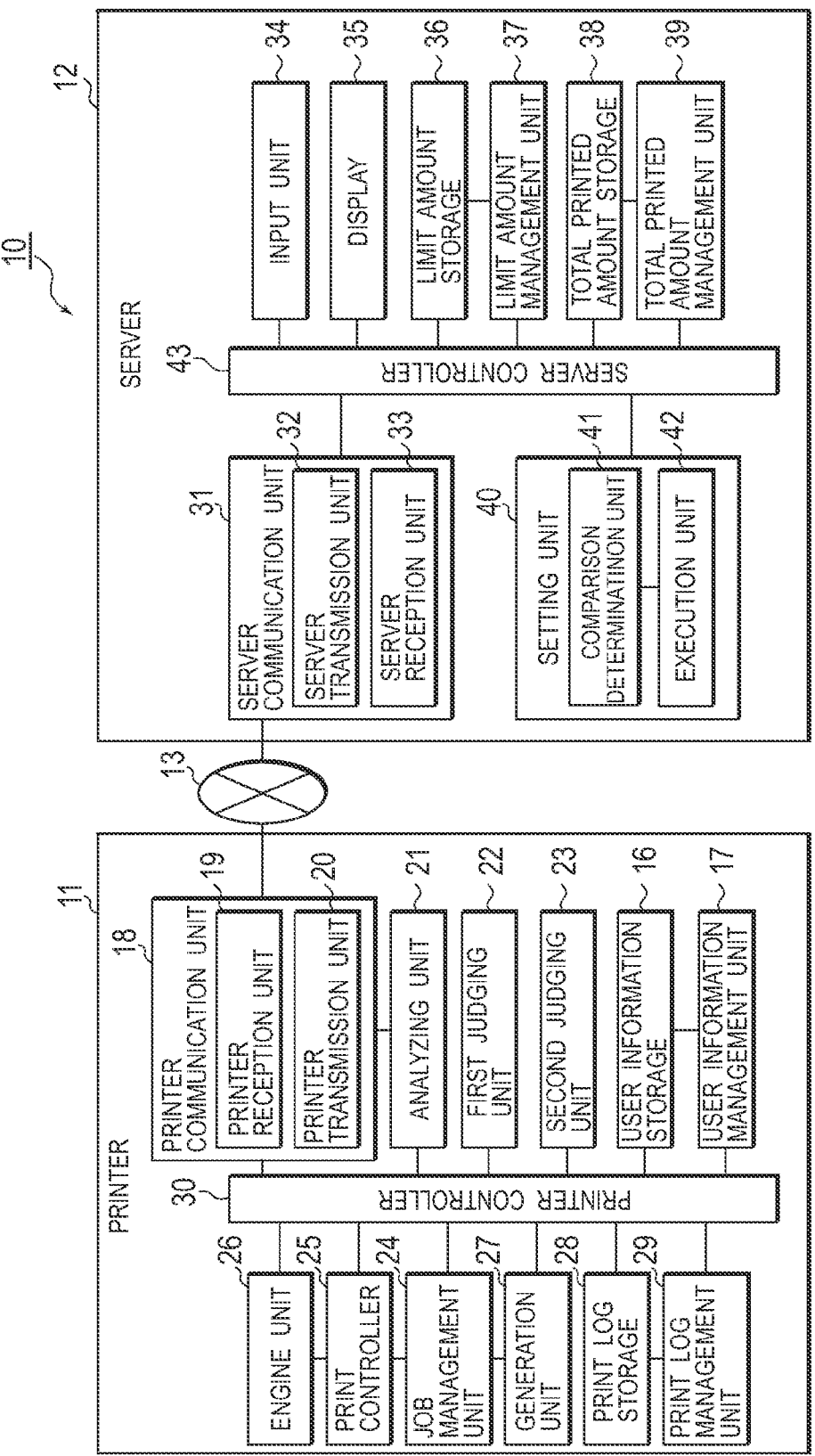
FIG. 1 is a block diagram of a functional configuration of a print system according to a first embodiment of the invention.

Hereinafter, embodiments of the invention will be described in detail with reference to the drawings.

In the respective drawings referenced herein, the same constituents are designated by the same reference numerals and duplicate explanation concerning the same constituents is omitted. All of the drawings are provided to illustrate the respective examples only.

[First Embodiment]

Figure 2:
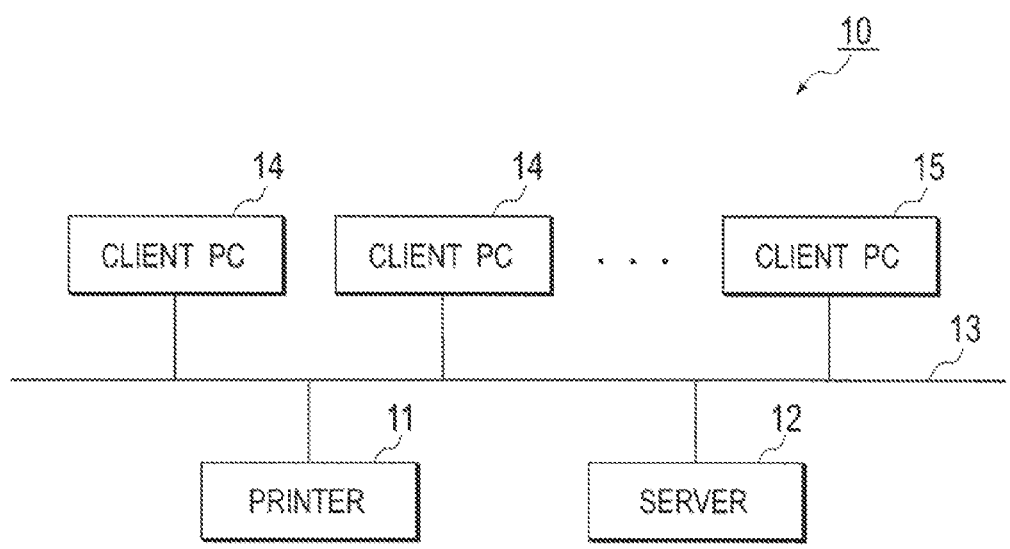
FIG. 2 is a diagram of an outline configuration of the print system according to the first embodiment of the invention.

FIG. 2 is a view of an outline configuration of a print system of a first embodiment of the invention.

Print system 10, which is an image forming system according to the invention, includes printer 11, server 12 communicatably connected to printer 11 via network 13 as shown in FIG. 2 and used for controlling printer 11 and charging fees. Server 12 obtains, at each predetermined period, history information showing print history from printer 11. Server 12 executes an accounting process calculating usage fees based on the history information.

Client PCs 14 are communicatably connected to print system 10 via network 13.

Client PC 14 is an information processing apparatus that is used by a registered user, who is permitted to print, such as a user who is subject to being charged. Client PC 14 has installed therein a printer driver for attaching user identification information to print data. The user identification information is used for the accounting process. Client PC 14 attaches a PIN (Personal Identification Number), which serves as user identification information, to print data including image data and an apparatus name (PC name), which serves as apparatus identification information, and transmits it to printer 11. In the embodiment, the PIN attached to the print data is a password comprising one to three digits. Such a PIN is input by each user and thus respective client PCs 14 store therein the different numbers from each other.

Also, client PC 15 is communicatably connected to print system 10 via network 13.

Client PC 15 is an information processing apparatus used by an unregistered user, who is an external user not permitted to print. That is, client PC 15 is temporarily connected to print system 10. Client PC 15 is capable of transmitting to printer 11 print data that includes image data and its PC name with no PIN attached thereto.

Next, functional configurations of printer 11 and server 12 will be described in detail with reference to FIG. 1.

FIG. 1 is a block diagram of a functional configuration of the print system according to the first embodiment of the invention.

As shown in FIG. 1, printer 11, which serves as an image forming apparatus, includes user information storage 16, user information management unit 17, printer communication unit 18, analyzing unit 21, first judging unit 22, second judging unit 23, job management unit 24, print controller 25, engine unit 26, generation unit 27, print log storage 28, print log management unit 29, and printer controller 30.

User information storage 16 is comprised of a hard disk device, for example, and configured to store user information. In the embodiment, user information storage 16 stores therein permission information for each user indicating whether the user has permission to print with printer 11.

FIG. 3 is an explanatory view of the configuration of the user information storage according to the first embodiment.

User information storage 16 stores therein permission information as "ON" or "OFF", for each PIN. Note that permission information "ON" means allowance to print, and "OFF" means a prohibition to print. The PIN is user information for indentifying each registered user. Note that the PIN for an unregistered user is set to "0".

For example, in user information storage 16 shown in FIG. 3A, permission information "ON" is set and stored corresponding to PIN "1", for example. This means that permission information for a registered user of PIN "1" is "ON" and the registered user of PIN "1" is thus permitted to print. In user information storage 16 shown in FIG. 3A, permission information "OFF" is stored corresponding to PIN "2". This means that permission information for a registered user of PIN "2" is "OFF" and the registered user of PIN "2" is thus not permitted to print. In user information storage 16 shown in FIG. 3A, permission information "ON" is stored corresponding to PIN "0". This means that permission information for an unregistered user is "ON" and thus the unregistered user is permitted to print.

In this embodiment, user information storage 16 only stores permission information corresponding to PINs, however, user information storage 16 may store various types of user information such as a user name or a PC name (a client PC name) used by the user.

User information management unit 17 manages user information storage 16. User information management unit 17 obtains and updates data in user information storage 16, based on job commands from printer controller 30.

As shown in FIG. 1, printer communication unit 18 includes printer reception unit 19 and printer transmission unit 20. Printer communication unit 18 receives from and transmits to server 12, client PCs 14 of the registered users, client PC 15 of the unregistered users, and the like via network 13 (see FIG. 2) various types of data.

Printer reception unit 19, which serves as a reception unit, receives print data from client PC 19 and client PC 15. Printer reception unit 19 also receives various types of command data from server 12.

Printer transmission unit 20 transmits to server 12 various types of data such as print logs, to be described later, or like.

Analyzing unit 21 analyzes data that are received by printer reception unit 19, determines whether the received data are either print data or command data, and informs printer controller 30 of the determination result.

First judging unit 22 determines whether or not a PIN is attached to the print data. When a PIN is attached to the print data, first judging unit 22 obtains the PIN and informs printer controller 30 of it. When the print data have no PIN attached thereto, first judging unit 22 selects "0" as its PIN, and informs printer controller 30 of it.

Second judging unit 23 determines whether or not to permit printing based on the permission information received from printer controller 30. For example, when permission information "ON" is received, second judging unit 23 determines that printing is permitted. When permission information "OFF" is received, second judging unit 23 determines that printing is prohibited. Second judging unit 23 informs printer controller 30 of the determination result.

Job management unit 24 converts various types of data, which is received from printer controller 30, to job data. Job management unit 24 creates a print job based on the print data and transmits it to print controller 25. Job management unit 24 also creates a job command based on the command data and transmits it to printer controller 30.

Job management unit 24 also manages the print job. Job management unit 24, when receiving the print result from print controller 25, creates the job command in order to create a print log, to be described later, and transmits it to generation unit 27.

Print controller 25 creates page data based on the print job received from job management unit 24 and transmits it to engine unit 26. When receiving a notice of completion of the print job from engine unit 26, print controller 25 informs job management unit 24 of the print result including a printed amount, which is the number of printed sheets or printouts, and the like.

Engine unit 26, which serves as an image forming unit, executes printing based on the page data. When the printing is complete, engine unit 26 informs print controller 25 of the completion.

Generation unit 27 creates a print log based on the job command from job management unit 24. In the embodiment, the print log created by generation unit 27 includes the PIN of the user, and a printed amount (the number of printed sheets) serving as history information showing the history of printing by engine unit 26.

Figure 4:
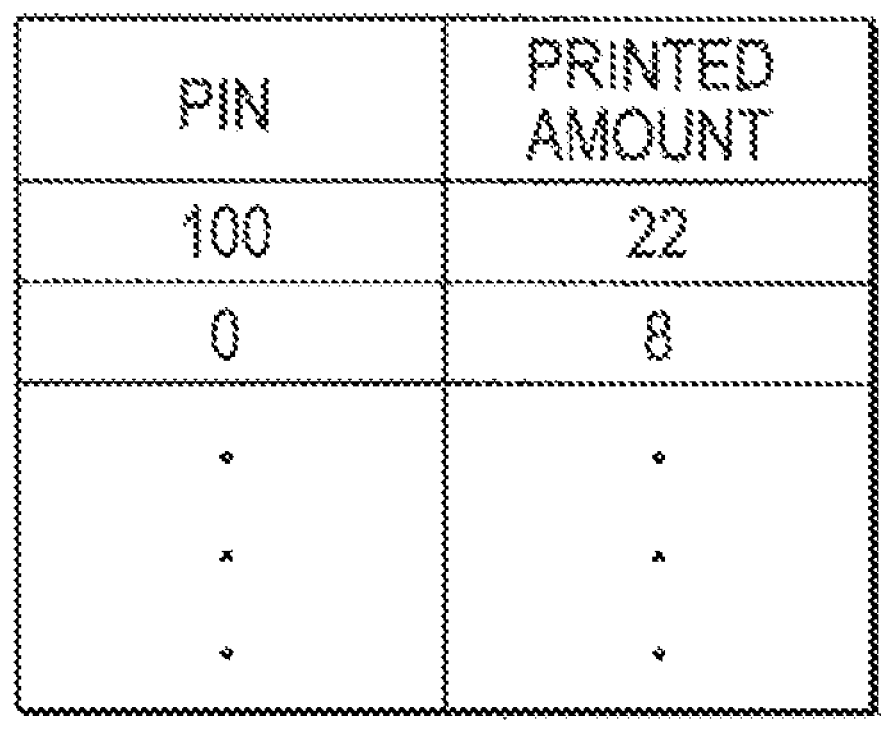

Print log storage 28, which serves as a storage, stores print logs therein. FIG. 4 is an explanatory view of the configuration of print log storage 28 of the first embodiment.

Print log storage 28 stores therein print logs of print jobs executed by printer 11 in a predetermined time. Each print log includes a PIN and a printed amount (the number of sheets printed) of each print job. The printed amount serves as history information in the embodiment.

For example, print log storage 28 shown in FIG. 4 stores therein PIN "100" and printed amount "22" which correspond to each other. This means a print job of twenty two sheets was executed based on print data transmitted from client PC 14 of a registered user of PIN "100". Print log storage 28 shown in FIG. 4 also stores therein PIN "0" and print amount "8" corresponding to PIN "0". This means a print job of eight sheets was executed based on print data transmitted from client PC 15 of an unregistered user of PIN "0".

Note that although print log storage 28 stores a pair of the PIN and the printed amount for each print job in this embodiment, the invention is not limited to this. For example, a total printed amount (the number of sheets printed in total) corresponding to each PIN in a predetermined time may be stored in print log storage 28 in the invention. Also, print log storage 28 may store therein, for each print job, a print jog name and/or an executed time and date which indentify each print job.

Print log management unit 29 manages print log storage 28 and obtains and updates data in print log storage 28 based on the job command from printer controller 30.

Printer controller 30 controls the components of printer 11.

As shown in FIG. 1, server 12 includes server communication unit 31, input unit 34, display unit 35, limit amount storage 36, limit amount management unit 37, total printed amount storage 38, total printed amount management unit 39, setting unit 40, and server controller 43.

Server communication unit 31 includes server transmission unit 32 and server reception unit 33 as shown in FIG. 1 and communicates with printer 11 through network 13.

Server transmission unit 32 transmits command data to printer 11. The command data includes, for example, log request command data requesting the print logs, user information acquisition command data requesting the user information, and the like.

Server reception unit 33 receives various types of data from printer 11. Server reception unit 33 serves as a server acquisition unit and receives the print logs from printer 11.

Input unit 34 comprises a keyboard and a mouse, for example. An operator, who is an administrator, inputs various information to input unit 34. In the embodiment, input unit 34 inputs a limit amount (limit information) that indicates the upper limit of the number of printed sheets for each user.

Display unit 35 is a display device that shows various screens. In the embodiment, display unit 35 shows a user information setting screen for setting the user information including the limit amount and the permission information and the like of each user.

Limit amount storage 36 is a memory unit and stores the limit amount serving as the limit information for limiting the amount of printouts from printer 11.

FIG. 5 is an explanatory view of the configuration of limit amount storage 36 of the first embodiment.

Limit amount storage 36 stores therein the limit amount (the limit information) and the permission information previously set in printer 11, for each PIN. Note that the limit amount is the upper limit of sheets that user is allowed to print in a predetermine time.

For example, limit amount storage 36 shown in FIG. 5B stores therein limit amount "10" corresponding to PIN "0". This means that an unregistered user of PIN "0" is allowed to print up to ten sheets. Limit amount storage 36 shown in FIG. 5B also stores therein permission information "ON" corresponding to PIN "0". This means that unregistered users are allowed to print.

Further, limit amount storage 36 shown in FIG. 5B stores therein limit amount "-" and permission information "ON", corresponding to PIN "1". This means that the registered user of PIN "1" is allowed to print and there is no limit amount set. That is, the registered user of PIN "1" has no limit to print.

Limit amount management unit 37 manages limit amount storage 36 and obtains and updates data in limit amount storage 36.

Total printed amount storage 38 is a storage to store the total printed amount, which is the total number of sheets printed in a predetermined time, of each PIN.

FIG. 6 is an explanatory view of the configuration of total printed amount storage 38 of the first embodiment.

Total printed amount storage 38 stores therein the total printed amount corresponding to each PIN. For example, total printed amount storage 38 shown in FIG. 6A stores therein total printed amount "2" corresponding to PIN "0" and stores therein total printed amount "0" corresponding to PIN "1".

Total printed amount management unit 39 manages total printed amount storage 38 and obtains and updates data in total printed amount storage 38.

Setting unit 90 includes comparison determination unit 41 and execution unit 92 as shown in FIG. 1.

Comparison determination unit 91 compares the total printed amount and the limit amount received from server controller 43 and determines whether or not the total printed amount is equal or greater than the limit amount. Upon determining that the total printed amount is equal to or greater than the limit amount, comparison determination unit 41 informs execution unit 42 of the corresponding PIN.

Execution unit 42 sets the PIN received from comparison determination unit 91 to a prohibited PIN and temporary stores it. Execution unit 42 creates setting command data in order to set the permission information in limit amount storage 36 and printer 11 based on the setting instruction received from server controller 43. The created setting command data is transmitted to server controller 43.

Server controller 43 controls the components of server 12.

Next, the operation of the print system according to the embodiment will be described.

First, the flow of setting a limit amount for limiting the number of sheets to be printed for an unregistered user in print system 10 will be described with reference to FIG. 7.

Figure 7:
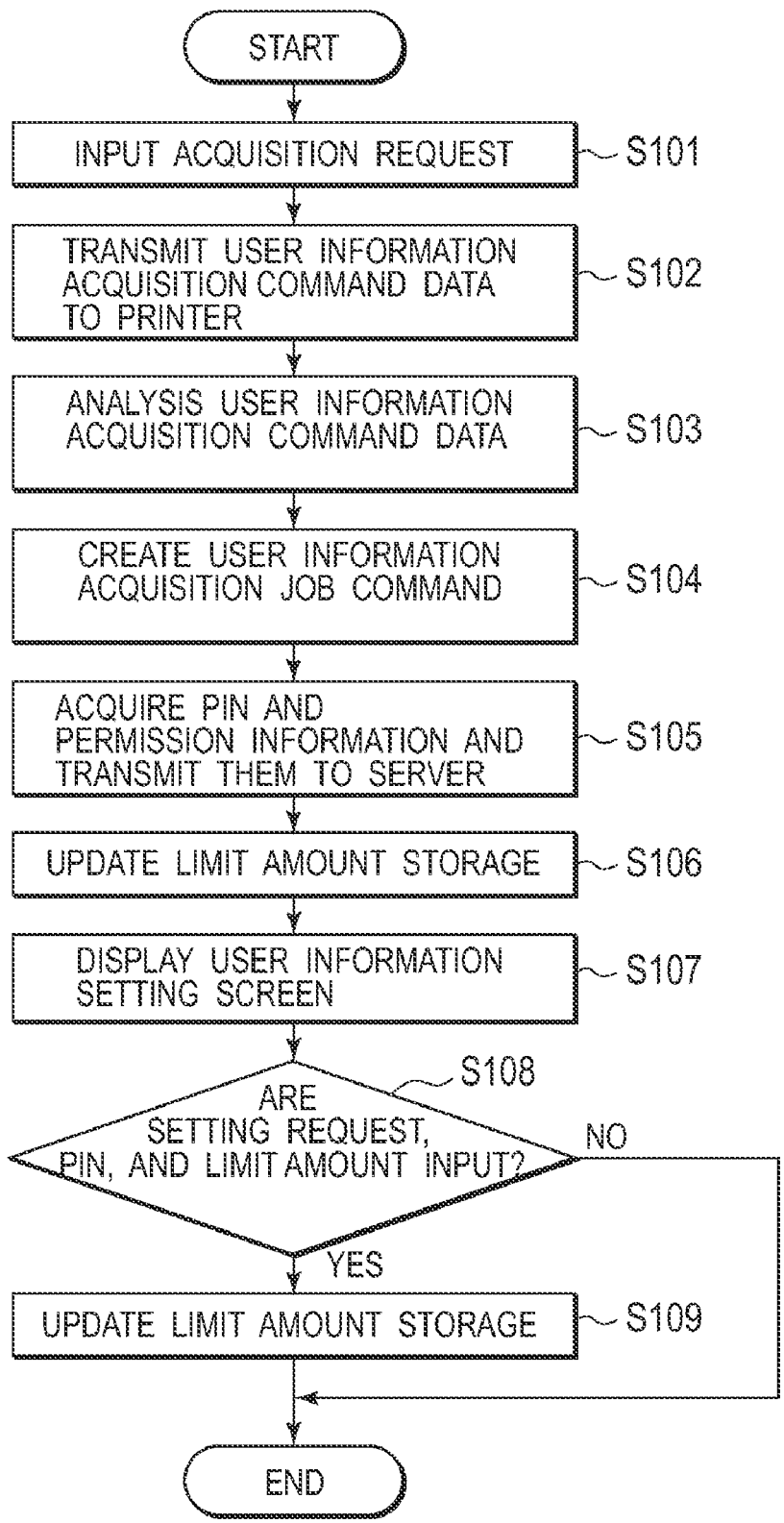
FIG. 7 is a flowchart showing a limit amount setting operation of the print system according to the first embodiment of the invention.

FIG. 7 is a flowchart showing the limit amount setting operation in the print system of the embodiment according to the invention.

Prior to the limit amount setting operation, printer 11 is turned on and an initialization process is executed. In the initialization process, user information management unit 17 of printer 11 sets a predetermined PIN of "0" to set the permission information for an unregistered user or an unknown user in user information storage 16 based on input from printer controller 30. User information management unit 17 stores permission information "ON" in user information storage 16 corresponding to PIN "0".

With this, PIN "0" is allocated and stored with the corresponding permission information of "ON" in user information storage 16 of printer 11 as shown in FIG. 3A.

Note that although permission information "ON" is set as the default setting corresponding to PIN "0" in printer 11 in the embodiment, permission information "OFF" may be set.

After that, the operator, who is the administrator uses input unit 34 to display the user information setting screen to set user information such as permission information, limit amount, or the like on display unit 35 of server 12. Based on this, input unit 34 inputs to server controller 43a an acquisition request for acquiring the user information (step S101).

Server controller 43 creates user information acquisition command data based on the acquisition request. Server transmission unit 32 then receives the user information acquisition command data from server controller 43 and transmits it printer 11 (step S102).

In printer 11, when printer reception unit 19 receives the user information acquisition command data from server 12, the user information acquisition command data is transmitted to analyzing unit 21. Analyzing unit 21 analyses the user information acquisition command data and determines that it is command data (step S103). Analyzing unit 21 then transmits the user information acquisition command data to job management unit 24.

Upon receiving the user information acquisition command data, job management unit 24 creates the user information acquisition command job (step S104). The user information acquisition command job is transmitted to user information management unit 17 through printer controller 30.

Upon receiving the user information acquisition command job, user information management unit 17 obtains each PIN and permission information corresponding to each PIN, from user information storage 16 (FIG. 3A) (step S105). Based on input from printer controller 30, printer transmission unit 20 transmits the PINs and the corresponding obtained permission information to server 12 (step S105).

In server 12, when server reception unit 33 receives the PINs and the permission information from printer 11, the PINs and the permission information are transmitted to limit amount management unit 37. Limit amount management unit 37 updates limit amount storage 36 based on the received PINs and the permission information (step S106).

In limit amount storage 36, the permission information of each user obtained from printer 11 is stored as shown in FIG. 5A. Here, the limit amount for an unregistered user is not set, and thus the stored limit amount for PIN "0" is "-".

Next, based on input from server controller 43, limit amount management unit 37 obtains the PINs, the limit amounts, and the permission information which are stored in limit amount storage 36. Display unit 35 then displays the user information setting screen including the PINs, the limit amounts, and the permission information (step S107).

Upon setting the limit amount for the unregistered user to "10", the operator uses input unit 34 to input a setting request, PIN "0", and the limit amount "10" (step S108).

Server controller 43 instructs limit amount management unit 37 to execute a setting based on the setting request, the PIN, and the limit amount that were input. Limit amount management unit 37 then updates limit amount storage 36 based on the setting instruction (step S109). Thus, the limit amount setting process in print system 10 ends.

As shown in FIG. 5B, limit amount "10" corresponding to PIN "0", is stored in limit amount storage 36.

As described above, the limit amount for an unregistered user is stored in limit amount storage 36 in server 12. Likewise, the limit amounts for registered users can be set on the user information setting screen.

Next, the flow in a case where printer 11 receives print data will be described with reference to FIGS. 8 and 9.

Figure 8:
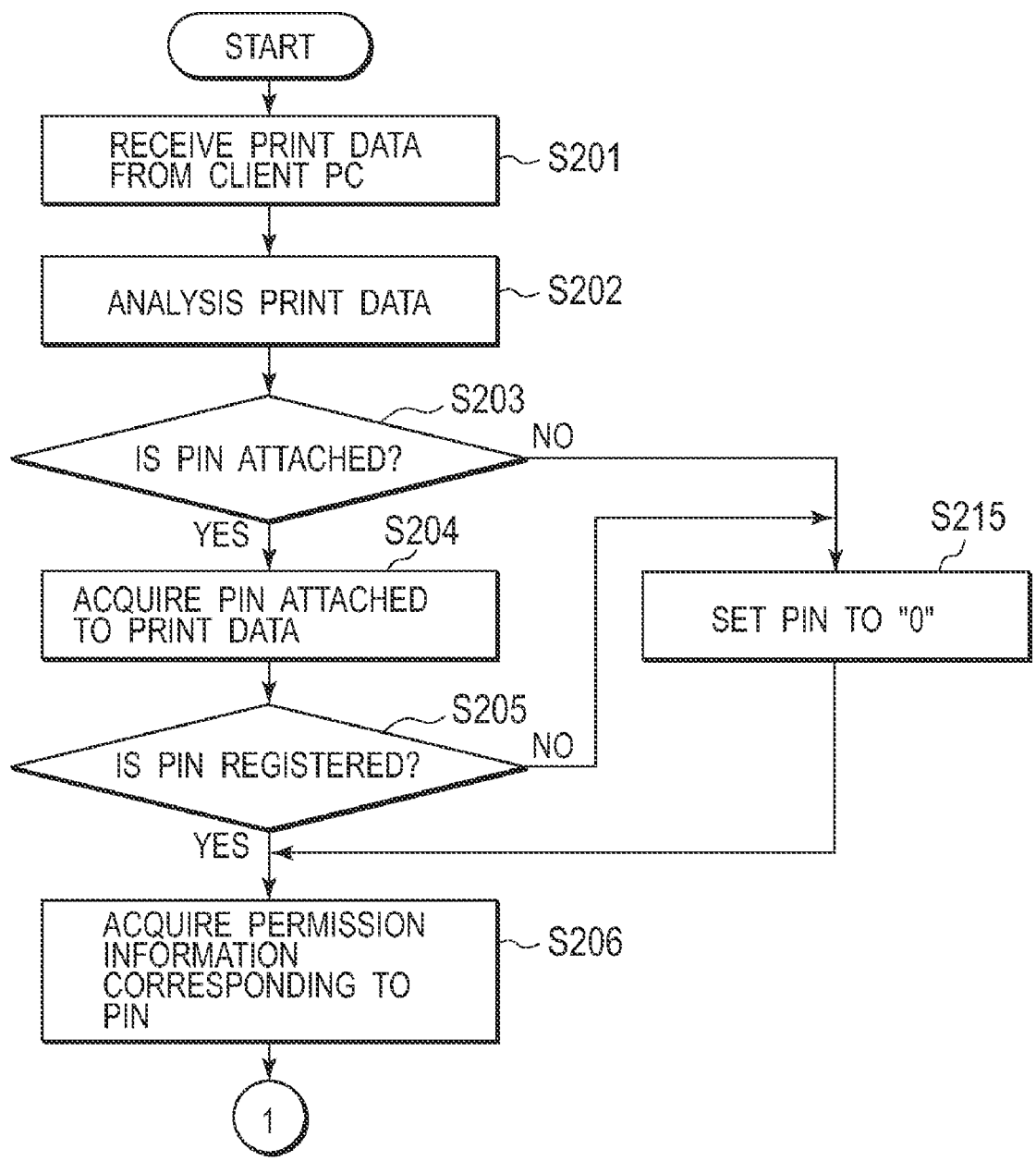
FIG. 8 is a flowchart (No. 1) showing a printing operation of a printer according to the first embodiment of the invention.
Figure 9:
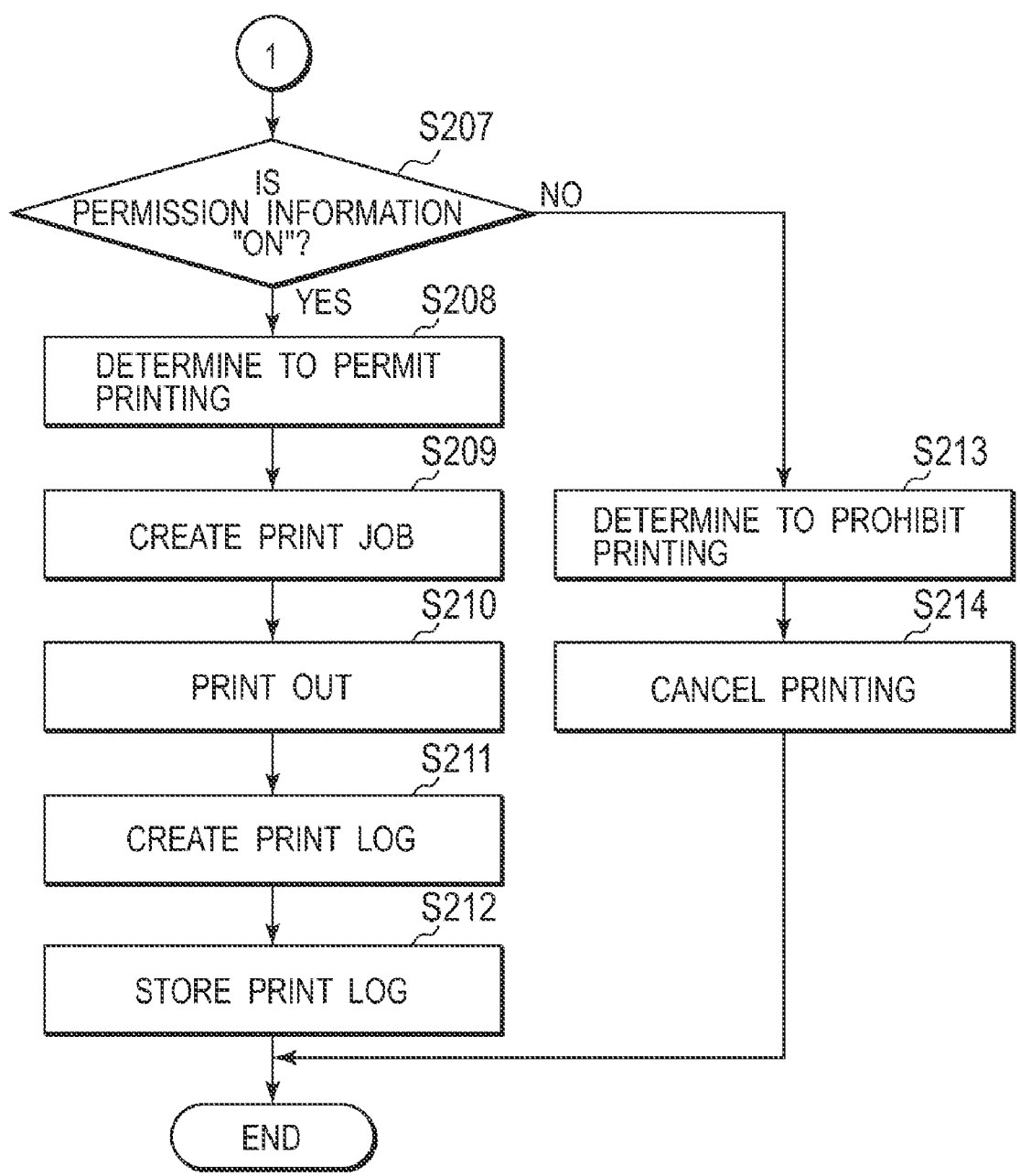
FIG. 9 is a flowchart (No. 2) showing the printing operation of the printer according to the first embodiment of the invention.

FIG. 8 is a first flowchart (No. 1) showing printing operation of printer 11 of the first embodiment, and FIG. 9 is a second flowchart (No. 2) showing more printing operation of printer 11 of the first embodiment.

First, flow in a case where print data of twenty two sheets is transmitted to printer 11 from client PC 14 of the registered user of PIN "100" will be described.

Client PC 14 attaches the registered PIN "100" to print data including image data and transmits it to printer 11.

In printer 11, printer reception unit 19 receives the print data from client PC 14 (step S201).

Next, analyzing unit 21 analyses the received data and, upon determining that it is print data, transmits it to first judging unit 22 (step S202).

First judging unit 22 determines whether the print data has a PIN attached thereto (step S203).

Upon determining that a PIN is attached to the print data (step S203), first judging unit 22 obtains the PIN and informs printer controller 30 of the PIN (step S204). First judging unit 22 obtains the PIN of "100" and informs print controller 30 of it.

Printer controller 30 instructs job management unit 24 to create a permission information acquisition job command for obtaining permission information and then transmits the created permission information acquisition job command and the informed PIN to user information management unit 17.

Responding to the permission information acquisition job command, user information management unit 17 determines whether the informed PIN has been registered in user information storage 16 (step S205). When it is determined that the informed PIN is already registered, user information management unit 17 obtains from user information storage 16 the permission information that is stored corresponding to the PIN (step S206).

In the case that PIN "100" is attached to the print data, user information management unit 17 obtains permission information "ON from user information storage 16 shown in FIG. 3A. The permission information is communicated to printer controller 30.

Next, printer controller 30 informs second judging unit 23 of the permission information. Second judging unit 23 determines, based on the permission information, whether or not to permit printing (step S207).

If the permission information is "ON" (step S207), second judging unit 23 permits printing and informs printer controller 30 of the determination result (step S208).

Responding to input from printer controller 30, job management unit 24 creates a print job based on the print data and transmits the print job to print controller 25 (step S209).

Print controller 25 creates page data of twenty two sheets based on the received print job and inputs them to engine unit 26. Engine unit 26 executes printing based on the page data (step S210). In printing, engine unit 26 forms images on printable sheets and discharges the printed sheets. After completing printing, engine unit 26 informs print controller 25 of the completion.

Next, print controller 25 informs job management unit 24 of the printing result of engine unit 26 including the printed amount, which is the number of sheets printed. That is, print controller 25 informs job management unit 24 of the print result including printed amount "22".

Job management unit 24 transmits to generation unit 27 a log creation job command for creating a print log. Based on the log creation job command, generation unit 27 creates a print log including the PIN and the printed amount (step S211). That is, generation unit 27 creates the print log including PIN "100" and printed amount "22". The created print log is transmitted to printer controller 30.

Next, printer controller 30 transmits to print log management unit 29 a log storage job command created by job management unit 24 and the print log received from generation unit 27. Print log management unit 29 stores the received print log in print log storage 28 (step S212). Then, the print process in printer 11 ends.

As shown in FIG. 4, the print log including PIN "100" and printed amount "22" are stored in print log storage 28.

If the permission information is "OFF" in step S207, second judging unit 23 determines to prohibit (not to permit) printing and transmits the determination result to printer controller 30 (step S213).

Printer controller 30 then informs job management unit 24 of a print cancelation, and job management unit 24 cancels the printing of the subject print data (step S214). Then, the print process in printer 11 ends.

As described above, the PIN attached to the print data is obtained and it is determined whether or not to permit printing based on the permission information corresponding to the PIN. When printing is executed, a print log including the PIN and the print amount is created and stored.

Next, flow in a case where print data of eight sheets is received from client PC 15 of an unregistered user will be described.

Client PC 15 of the unregistered user transmits the print data including image data of the eight sheets to printer 11.

In printer 11, printer reception unit 19 receives the print data from client PC 15 (step S201) and then analyzing unit 21 analyses the received data and determines that the received data is print data (step S202).

Next, first judging unit 22 determines whether a PIN is attached to the print data (step S203).

If it is determined that no PIN is attached to the print data (step S203), first judging unit 22 set its PIN to "0" (step S215). In this case, first judging unit 22 informs printer controller 30 of the set PIN "0".

Next, printer controller 30 transmits a permission information acquisition job command job and the PIN "0" to user information management unit 17. User information management unit 17 determines that PIN "0" is stored in user information storage 16 (step S205), and user information management unit 17 obtains permission information corresponding to the PIN "0" from user information storage 16 (step S206).

Next, second judging unit 23 determines whether the permission information permits printing (step S207). A description of the process after step S207 will be omitted in detail since it is the same as that in the case of the registered user. When printing of eight sheets is executed (step S210), generation unit 27 creates a print log including the PIN "0" and printed amount "8" (step S211), and then the print log is stored in print log storage 28 (step S212). Then, the print process in printer 11 ends.

As shown in FIG. 4, the print log including the PIN "0" and the printed amount "8" is stored in print log storage 28.

If it is determined that a PIN is attached in step S203, the PIN is obtained in step S204. Then it is determined that the PIN is not registered in step S205, and the PIN is reset to "0" (step S215). Next, user information management unit 17 obtains permission information corresponding to the PIN "0" and informs printer controller 30 of it (step S206), and then the process after step S207 is executed.

As described above, in a case where no PIN is attached to the print data or an unregistered PIN is attached to the PIN, it is determined whether or not to permit printing based on the permission information set for the unregistered user.

Figure 10:
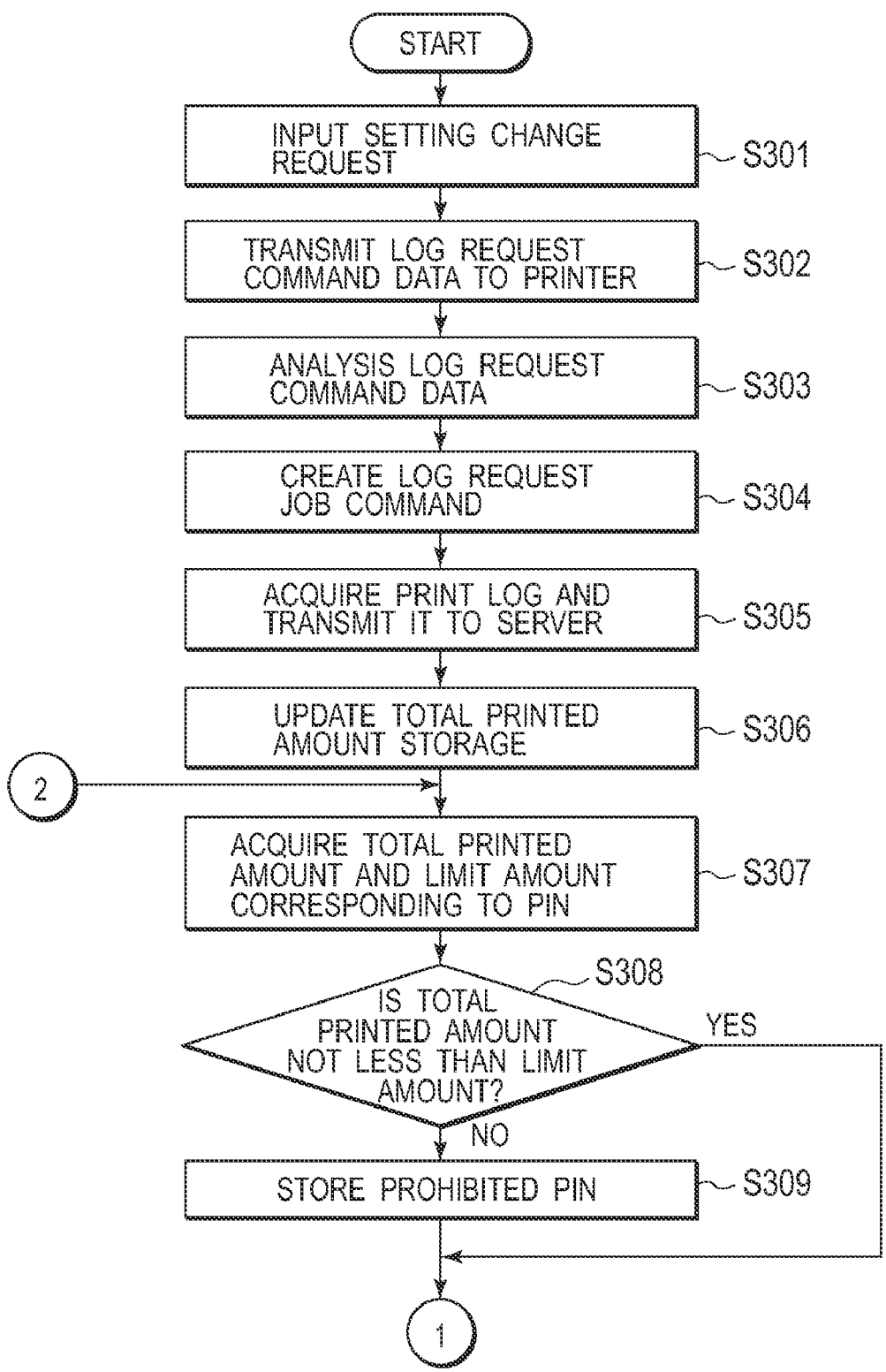
FIG. 10 is a flowchart (No. 1) showing an OFF setting operation of the print system according to the first embodiment of the invention.
Figure 11:
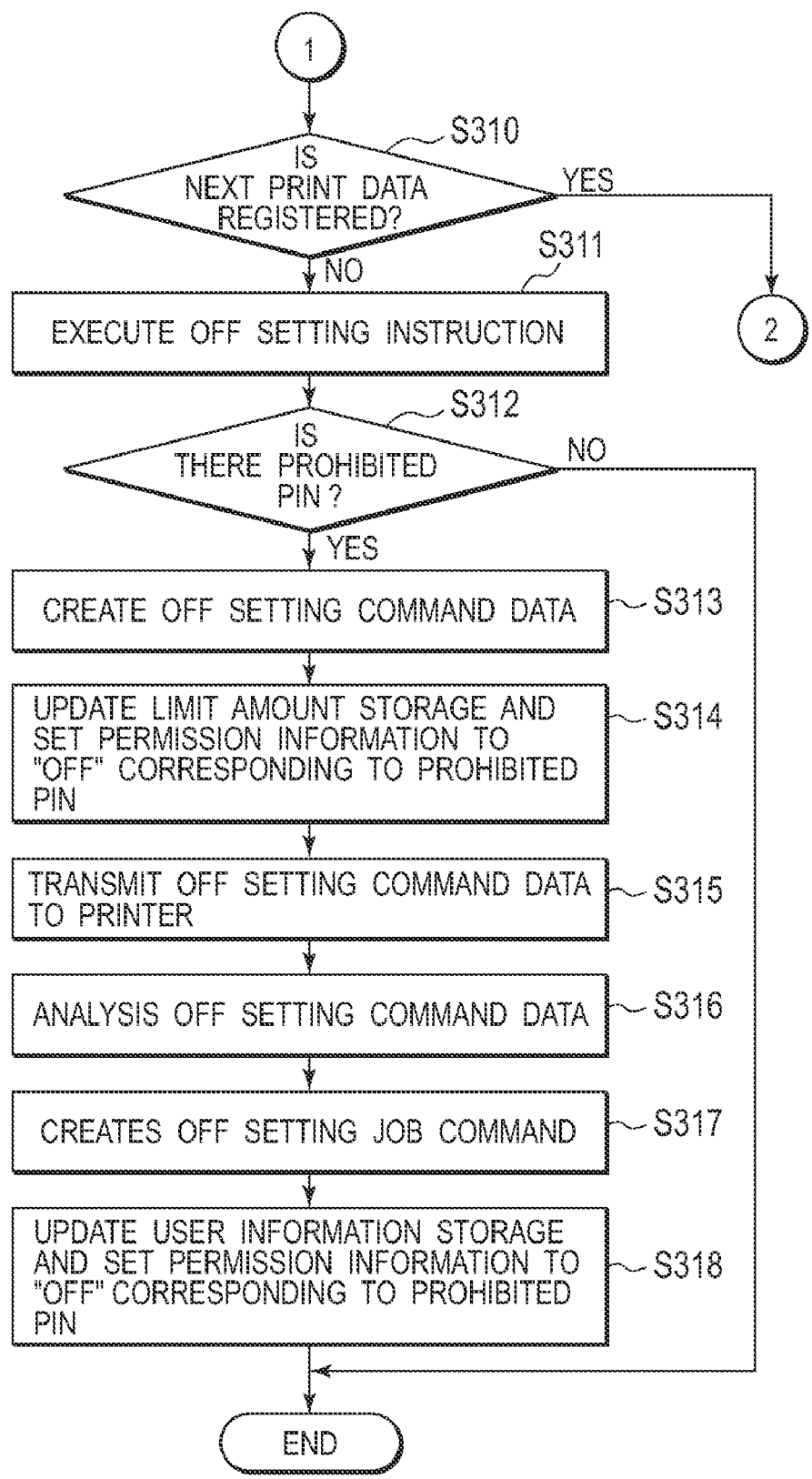
FIG. 11 is a flowchart (No. 2) showing the OFF setting operation of the print system according to the first embodiment of the invention.

Next, flow wherein the total printed amount and the limit amount for each PIN are compared to each other and then the setting of the permission information is changed in print system 10 will be described with reference to FIGS. 10 and 11. FIG. 10 is a first flowchart (No. 1) showing an OFF setting operation of the print system according to the first embodiment, and FIG. 11 is a second flowchart (No. 2) showing more of the OFF setting operation of the print system according to the first embodiment.

Here, a case will be described in which a total printed amount of an unregistered user reaches its limit amount and then its permission information is changed from "ON" to "OFF".

In server 12, input unit 34, at predetermined time intervals (for example, every one hour) or, based on input from an operator, inputs a setting change request requesting changing the permission information in order to revise the setting of the permission information for the PIN (step S301).

Based on the setting change request, server controller 43 creates log request command data to obtain print logs from printer 11. Server transmission unit 32 transmits the log request command data to printer 11 (step S302).

In printer 11, printer reception unit 19 receives the log request command data from server 12 and then analyzing unit 21 analyses the received data and determines that the data is command data (step S303).

Next, job management unit 24 creates the log request job command based on the log request command data (step S304). The created log request job command is then transmitted to print log management unit 29 via printer controller 30.

Print log management unit 29 receives the log request job command and then obtains the print logs including PINs and printed amounts from print log storage 28 (FIG. 4) (step S305). Based on input from printer controller 30, printer transmission unit 20 transmits the obtained print logs to server 12 (step S305). Print log management unit 29 deletes the obtained print logs in print log storage 28.

In server 12, server reception unit 33 receives the print logs from printer 11 and then the print logs are transmitted to total printed amount management unit 39 via server controller 43. Total printed amount management unit 39 updates total printed amount storage 38 based on the PINs and the corresponding printed amount in the received print logs (step S306).

Note that before the update, total printed amount "2" for PIN "0" and total printed amount "10" for PIN "100" were stored in total printed amount storage 38 as shown in FIG. 6A. Upon the update, total printed amount management unit 39 updates total printed amount storage 38 based on the print logs obtained from printer 11, as shown in FIG. 6B. For example, the total printed amount for PIN "0" in total printed amount storage 38 is updated to "10" by adding the obtained printed amount "8" to the pre-update total printed amount of "2". Also, the total printed amount for PIN "100" in total printed amount storage 38 is updated to "32" by adding the obtained printed amount "22" to the pre-update total printed amount "10".

Next, based on input from server controller 43, total printed amount management unit 39 obtains the total printed amount for PIN "0" from total printed amount storage 38 (step S307). That is, total printed amount management unit 39 obtains total printed amount "10" for PIN "0" from total printed amount storage 38 shown in FIG. 6B. Limit amount management unit 37 obtains the limited amount for PIN "0" from limit amount storage 36 (step S307). That is, limit amount management unit 37 obtains limit amount "10" for PIN "0" from limit amount storage 36 shown in FIG. 5B. The total printed amount and the limit amount obtained are then communicated to server controller 43.

Server controller 43 informs setting unit 40 of the total printed amount and the limit amount, and its PIN. Comparison determination unit 41 of setting unit 40 compares the informed total printed amount with the informed limit amount and determines whether or not the total printed amount is equal to or greater than the limit amount (step S308).

When comparison determination unit 41 compares total printed amount "10" and the limit amount "10" and determines that the total printed amount is equal to or greater than) the limit amount (step S308), comparison determination unit 41 informs execution unit 42 of the corresponding PIN of "0". Execution unit 42 sets and stores the informed PIN of "0" as a prohibited PIN (step S309).

Setting unit 40 informs server controller 43 of the completion of the comparison/determination process for PIN "0". Server controller 43 determines whether a next PIN is registered in total printed amount storage 38 (step S310).

When server controller 43 determines that the next PIN is registered (step S310), total printed amount management unit 39 obtains total printed amount "0" for PIN "1" from total printed amount storage 38 and limit amount management unit 37 obtains limit amount "-" for PIN "1" from limit amount storage 36 (step S307).

Server controller 43 informs setting unit 40 of PIN "1", total printed amount "0", and limit amount "-". Comparison determination unit 41 compares the total printed amount to the limit amount and determines whether or not the total printed amount is equal to or greater than the limit amount (step S308).

Since the limit amount for PIN "1" is not set in limit amount storage 36, comparison determination unit 41 determines that the total printed amount is less than the limit amount (step S308). Comparison determination unit 91 informs server controller 93 of the completion of the comparison determination process for PIN "1". Upon being informed of this notice, server controller 43 determines whether a next PIN is registered (step S310).

As described above, the total printed amount and the limit amount for each registered PIN that is registered in server 12 are obtained, and the comparison determination process is executed. When it is determined that a total printed amount for a PIN is equal to or greater than its limit amount, the PIN is set and stored as a prohibited PIN.

When it is determined that a next PIN is not registered or it is determined that the check of all the PIN are completed (step S310), server controller 43 instructs setting unit 90 to execute an OFF setting instruction (step S311).

In setting unit 40, when the prohibited PIN is stored (step S312), execution unit 42 creates OFF setting command data and transmits it to server controller 43 in order to set permission information for each prohibited PIN to "OFF" based on the OFF setting instruction from server controller 43 (step S313).

Limit amount management unit 37 updates limit amount storage 36 based on the OFF setting command data and sets the permission information for the prohibited PIN to "OFF" (step S314).

In limit amount storage 36, as shown in FIG. 5C, the permission information for the prohibited PIN of "0" is stored as a "OFF".

Next, based on input from server controller 43, server transmission unit 32 transmits the OFF setting command data to printer 11 (step S315).

In printer 11, printer reception unit 19 receives the OFF setting command data from server 12 and then analyzing unit 21 executes an analysis of the received data and determines that the received data is command data (step S316).

Next, job management unit 24 creates the OFF setting job command based on the OFF setting command data (step S317). The OFF setting command job is transmitted to user information management unit 17 via printer controller 30.

User information management unit 17 updates user information storage 16 based on the OFF setting job command and sets the permission information for the prohibited PIN to "OFF" (step S318). Then, the OFF setting process in print system 10 ends.

As shown in FIG. 3B, the permission information for prohibited PIN "0" is stored as "OFF" in user information storage 16.

In step S312, if it is determined that no prohibited PIN exists, execution unit 42 informs server controller 43 of the determination result. Print system 10 then ends the OFF setting process.

As described above, for a PIN whose total printed amount reached its limit amount, the permission information of "OFF" is set in printer 11 and server 12, thereby prohibiting printing using printer 11 by the PIN.

Note that the total printed amount stored in total printed amount storage 38 of server 12 is reset to "0" at predetermined time intervals such as one day in executing the accounting process, for example. Upon this resetting, permission information "OFF" with the limit amount stored in limit amount storage 36 and user information storage 16 of printer 11 is changed to "ON".

As described above, since the print system of the embodiment sets the permission information and the limit amount for the unregistered user in advance, the print system is able to print based on print data within the range of the set limit amount, even though a PIN is not attached to the print data. Therefore, the print system of the embodiment does not have to install the print driver that attaches a PIN to print data, and a client PC of an external user (an outsider) is able to use the printer temporarily by transmitting print data there-from. Also, the print system is able to omit burdensome task of having to register or unregister a PIN for the temporary user by the administrator of the print system. Further, when printouts from a user exceed its limit amount, the user is prohibited from printing. Accordingly, the print system improves convenience while reducing the cost.

Note that, although the permission information for each PIN is set in both the printer and the server in the embodiment, the permission information may be set only in the printer.

Although the limit amount for each PIN is set in the server and the server executes the comparison determination process comparing the total printed amount to the limit amount in the embodiment, the invention is not limited to this. Also, the printer may store therein the limit amount for each user and execute the comparison determination process. Further, the comparison determination process may be executed at every printing, thereby certainly prohibiting from printing more than its limit amount.

[Second Embodiment]

Figure 12:
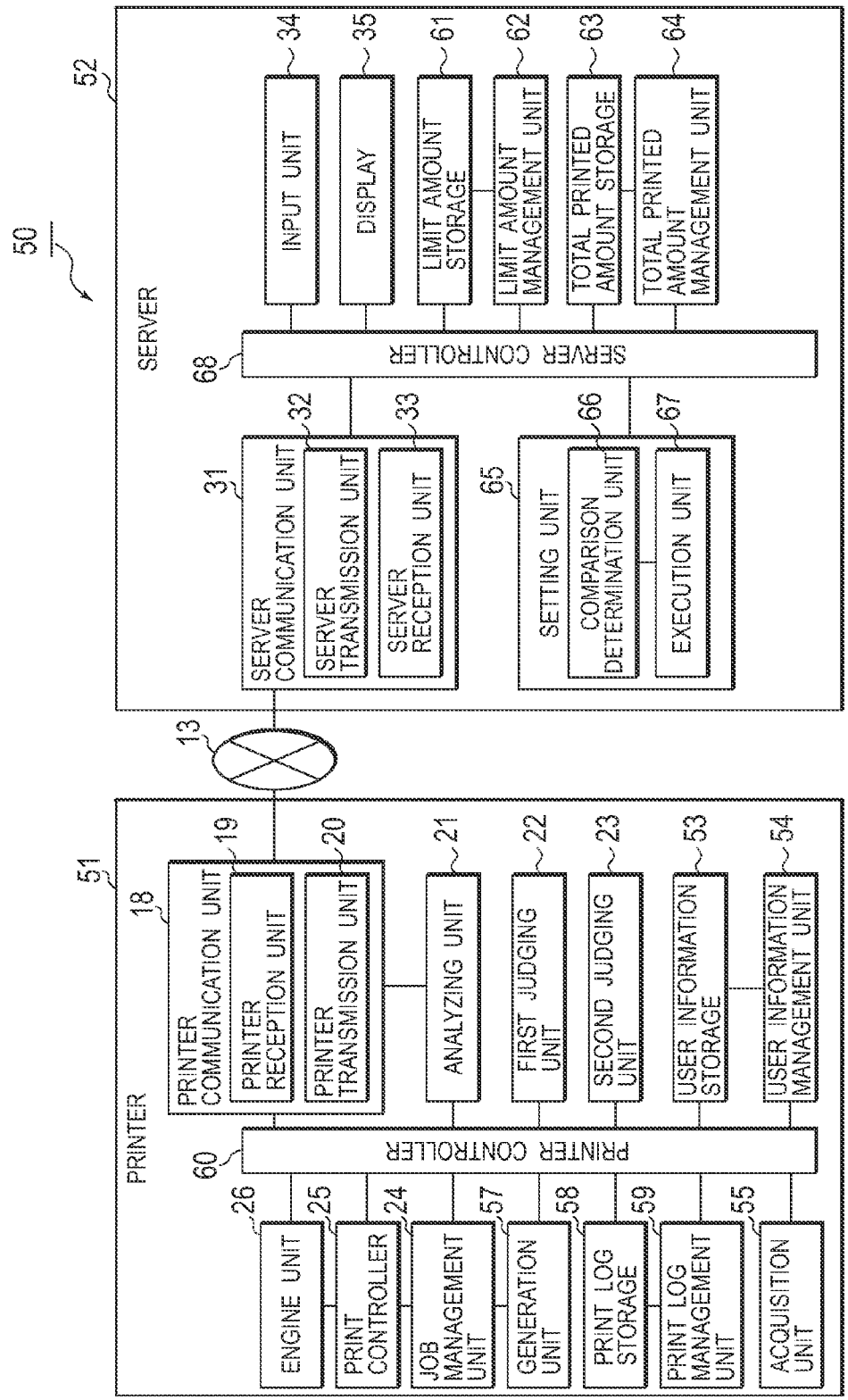
FIG. 12 is a block diagram of a functional configuration of a print system according to a second embodiment of the invention.

FIG. 12 is block diagram showing a functional configuration of a print system of a second embodiment according to the invention. Print system 50 of the embodiment has acquisition unit 55 in printer 51 for acquiring a PC name from print data, which is added to the configuration of the first embodiment, and thus is different from the first embodiment. Note that in the second embodiment, the same constituents as those of the first embodiment are designated by the same reference numerals and duplicate explanation as to the same constituents is omitted as long as possible.

As shown in FIG. 12, print system 50, which is an image forming system according to the invention, includes printer 51 and server 52 communicatably connected to printer 51 via network 13 and configured to manage printer 51 and to executes accounting.

Also, client PCs 14 (not shown) used by registered users and client PCs 15 (not shown) used by unregistered users are communicatably connected to print system 50 via network 13.

As shown in FIG. 12, printer 51, which serves as an image forming apparatus, includes user information storage 53, user information management unit 54, printer communication unit 18, analyzing unit 21, first judging unit 22, second judging unit 23, acquisition unit 55, job management unit 24, print controller 25, engine unit 26, generation unit 57, print log storage 58, print log management unit 59, and printer controller 60.

User information storage 53 is comprised of, for example, a hard disk device and stores therein user information. In this embodiment, user information storage 53 stores therein permission information for each user indicating whether or not to permit each user to print using printer 51.

FIGS. 13A, 13B, and 13C are explanatory views showing the configuration of the user information storage of the second embodiment. In user information storage 53, a PIN serving as user identification information, a PC name serving as apparatus identification information, and permission information are stored corresponding to each other.

For example, in user information storage 53 shown in FIG. 13A, permission information "ON" is stored corresponding to PIN "1" and PC name "PC1". This means that a registered user of PIN "1" is permitted to print by transmitting print data from client PC 14 of PC name "PC1". The PC name "-" is stored corresponding to PIN "0" in user information storage 53 shown in FIG. 13A. This means that the PC name of client PC 15 used by an unregistered user, which is a user corresponding to PIN "0", is unregistered in user information storage 53.

Note that although permission information is stored corresponding to PINs and PC names in user information storage 53 in the embodiment, user names may be stored instead of the PC names.

User information management unit 54 manages user information storage 53 and obtains and updates data in user information storage 53 based on job commands from printer controller 60.

Acquisition unit 55, which serves as an apparatus acquisition unit, obtains a PC name from print data and informs printer controller 60 of it.

Generation unit 57 creates a print log including a printed amount (the number of printed sheets) serving as history information. The print log created by generation unit 57 in this embodiment is comprised of a PIN, a PC name, and a printed amount.

Print log storage 58, which serves as storage, stores therein print logs of print jobs executed in a predetermined time. FIG. 14 is an explanatory view showing the configuration of the print log storage according to the second embodiment.

Print log storage 58 of the embodiment stores therein print logs, each of which for each print job includes a PIN, a PC name, and a printed amount.

For example, PIN "100", PC name "PC100", and printed amount "22" that correspond to each other are stored in print log storage 58 shown in FIG. 14. This means that printing of twenty two sheets is already executed based on print data transmitted from client PC 19 of PC name "PC100". Also, PIN "0", PC name "PC0", and printed amount "10" that correspond to each other are stored in print log storage 58 shown in FIG. 14. This means that printing of ten sheets is already executed based on print data transmitted from client PC 15 of PC name "PC0" used by an unregistered user.

Note that although print log storage 58 stores therein a PIN, a PC name, and a printed amount for each print job in this embodiment, the invention is not limited to this. For example, a total printed amount, which indicates the total number of sheets printed in a predetermined time, may be stored corresponding to each pair of PIN and PC name.

Print log management unit 59 has manages print log storage 58 and obtains and updates data in print log storage 58 based on job commands from printer controller 60.

Printer controller 60 controls the components of printer 51.

Server 52 includes, as shown in FIG. 12, server communication unit 31, input unit 34, display 35, limit amount storage 61, limit amount management unit 62, total printed amount storage 63, total printed amount management unit 64, setting unit 65, and server controller 68.

Limit amount storage 61, which is a storage, stores the limit amount, which serves as limit information, for each PIN. FIG. 15 is an explanatory view of the configuration of limit amount storage 61 according to the second embodiment.

For example, limit amount "1000" is stored corresponding to PIN "100" in limit amount storage 61 shown in FIG. 15. This means that a registered user of PIN "100" is permitted to print up to one thousand sheets.

Also, limit amount "10" is stored corresponding to PIN "0" in limit amount storage 61 shown in FIG. 15. This means that unregistered users are permitted to print up to ten sheets.

Note that although only the limit amount is stored corresponding to each PIN in limit amount storage 61 in this embodiment, a PC name and/or permission information may be stored corresponding to the limit amount.

Limit amount management unit 62 manages limit amount storage 61 and obtains and updates data in limit amount storage 61.

Total printed amount storage 63 is a storage storing therein the total printed amount for each PIN and PC name. FIG. 16 is an explanatory view of the configuration of total printed amount storage 63 of the second embodiment.

For example, corresponding to PIN "1" and PC name "PC1", the total printed amount "0" is stored in total printed amount storage 63 shown in FIG. 16A.

Total printed amount management unit 64 manages total printed amount storage 63 and obtains and updates data in total printed amount storage 63.

As shown in FIG. 12, setting unit 65 includes comparison determination unit 66 and execution unit 67.

Comparison determination unit 66 compares a total printed amount and a limit amount received from server controller 68 and determines whether or not the total printed amount is equal to or greater than the limit amount. Upon determining that the total printed amount is equal to or greater than the limit amount, comparison determination unit 66 communicates a PIN and a PC name to execution unit 67.

Execution unit 67 sets the PIN and the PC name received from comparison determination unit 66 as a prohibited PIN and a prohibited PC name, and temporarily stores them. Based on input from server controller 68, execution unit 67 creates the setting command data and transmits it to server controller 68 in order to set permission information in printer 51.

Server controller 68 controls the components of server 52.

Next, operation of print system 50 of the second embodiment will be described. Note that the flow of setting the limit amount for an unregistered user to server 52 is the same as that in the first embodiment (FIG. 7) and thus the description thereof will be omitted.

Figure 17:
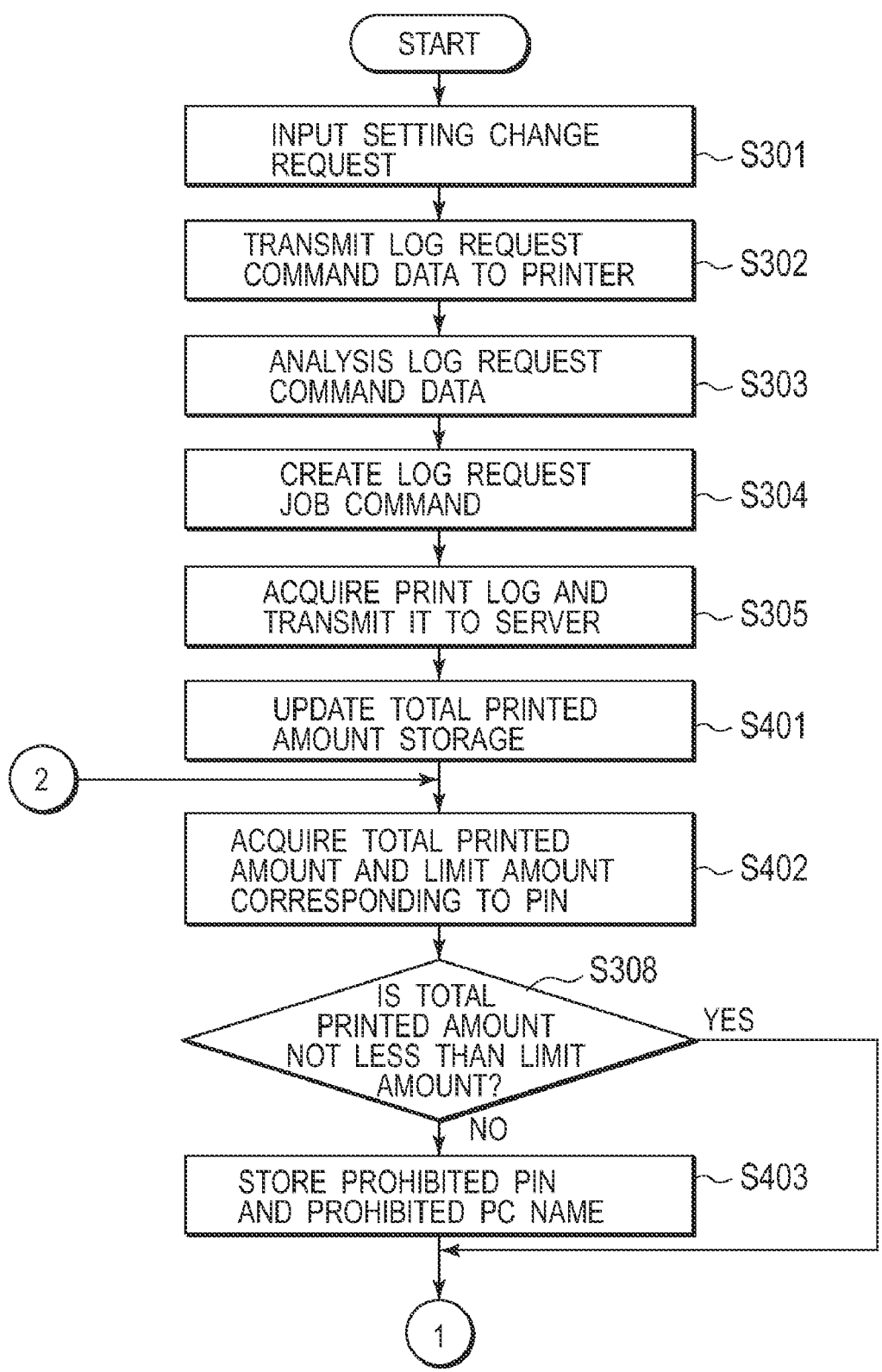
FIG. 17 is a flow chart (No. 1) showing an OFF setting operation of the print system according to the second embodiment of the invention.
Figure 18:
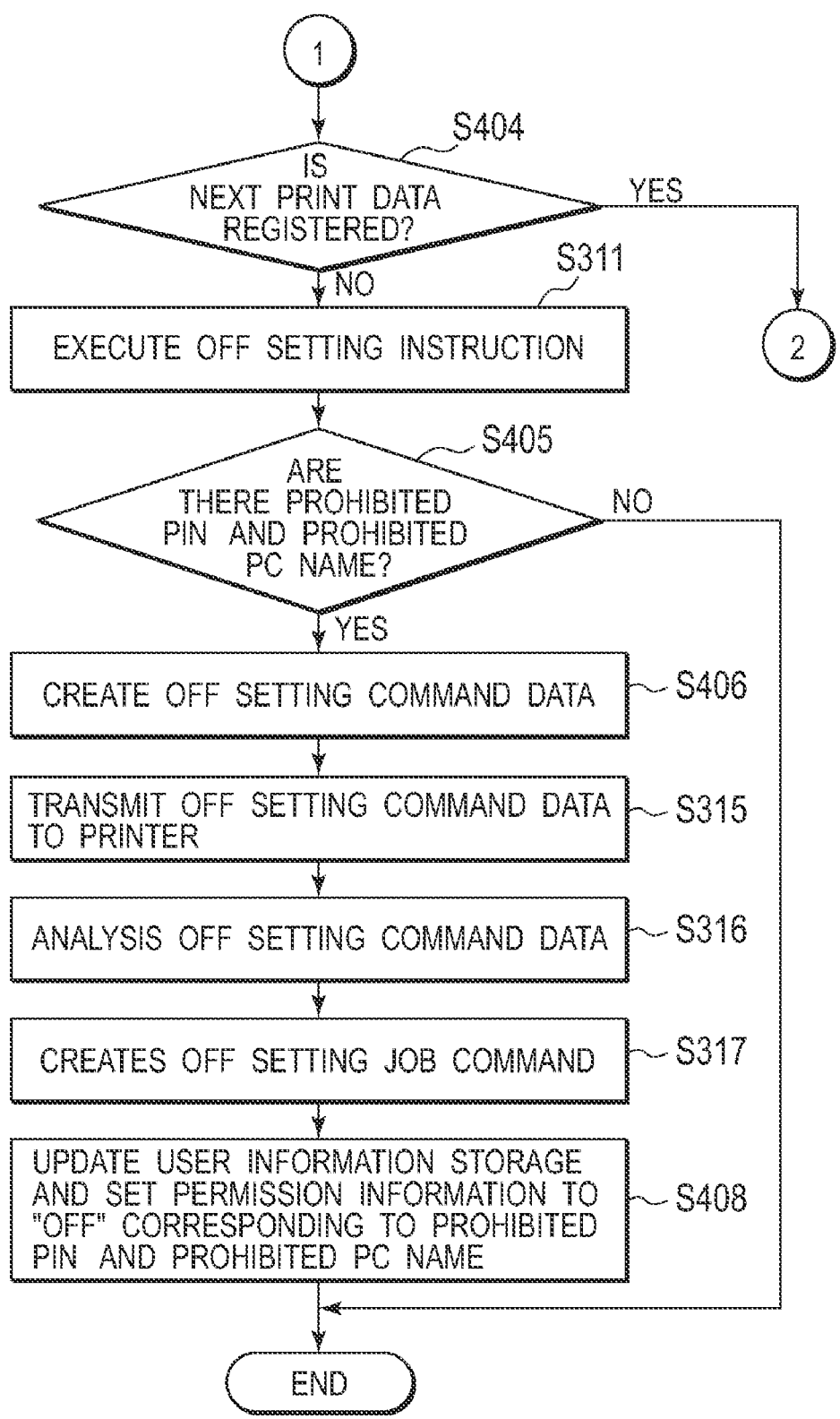
FIG. 18 is a flow chart (No. 2) showing the OFF setting operation of the print system according to the second embodiment of the invention.

Here, the flow of comparing the total printed amount and the limit amount for each PIN and changing the setting of the permission information in print system 50 will be described with reference to FIGS. 17 and 18. FIG. 17 is a first flowchart (No. 1) showing OFF setting operation of the print system of the second embodiment, and FIG. 18 is a second flowchart (No. 2) showing more of the OFF setting operation of the print system of the second embodiment.

Here, the case where the total printed amount of an unregistered user reaches its limit amount and its permission information is changed from "ON" to "OFF" will be described.

When a setting change request for changing the setting of the permission information is input from input unit 34 in server 52 (step S301), server controller 68 creates log request command data and server transmission unit 32 transmits the log request command data to printer 51 (step S302).

In printer 51, printer reception unit 19 receives the log request command data from server 52 and then analyzing unit 21 analyses it and determines that it is a command data (step S303).

Job management unit 24 creates the log request job command (step S304), and print log management unit 59 obtains print logs from print log storage 58 (FIG. 14) based on the log request job command (step S305). Printer transmission unit 20 transmits the print logs to server 52 (step S305). Print log management unit 59 then deletes the obtained print logs in print log storage 58.

In server 52, server reception unit 33 receives the print logs from printer 51 and then total printed amount management unit 64 updates total printed amount storage 63 based on PINs and printed amounts corresponding to the PINs in the received print logs (step S401).

Before the update, total printed amount "10" corresponding to PIN "100" and PC name "PC100" is stored in total printed amount storage 63 as shown in FIG. 16A. Upon the update, corresponding to PIN "100" and PC name "PC100" in the obtained print logs, total printed amount management unit 64 updates its total printed amount to "32" as shown in FIG. 16B by adding printed amount "22" to the pre-update total printed amount of "10".

As shown in FIG. 16A, before the update, total printed amount "0" corresponding to PIN "0" and PC name "-" is stored in total printed amount storage 63 and a total printed amount corresponding to PIN "0" and PC name "PC0" is not stored in total printed amount storage 63. Upon the update, total printed amount management unit 64 creates a new PC name of "PC0" with PIN "0" in total printed amount storage 63 in order to update based on a print log having a printed amount of "10" corresponding to PIN "0" and PC name "PC0" and then stores the total printed amount of "10" corresponding to PC name "PC0" in total printed amount storage 63 (FIG. 16B).

Total printed amount storage 63 is thus updated based on the obtained print logs (step S401).

Next, total printed amount management unit 64 obtains sequential data one by one from total printed amount storage 63 (FIG. 16B). Namely, first, total printed amount management unit 64 obtains total printed amount "0" corresponding to PIN "0" and PC name "-" (step S402). Limit amount management unit 62 obtains limit amount "10" corresponding to PIN "0" from limit amount storage 61 (FIG. 15) (step S402). The total printed amount and limit amount is sent to informed server controller 68.

Server controller 68 informs setting unit 65 of the received total printed amount "0", the received limit amount of "10", PIN "0", and PC name "-". Comparison determination unit 66 of setting unit 65 then compares the received total printed amount and the received limit amount and determines whether or not the total printed amount is equal to or greater than the limit amount (step S308).

Upon determining that the total printed amount of "0" is less than the limit amount of "10" (step S308), comparison determination unit 66 notifies server controller 68 of the completion of the comparison determination process for PIN "0" and PC name "-". After receiving the notification, server controller 68 determines whether a next pair of PIN and PC name are registered (step S404).

When determining that the next PIN and PC name (PIN "0" and PC name "PC0") are registered (step S404), total printed amount management unit 64 obtains total printed amount "10" corresponding to the PIN of "0" and the PC name of "PC0" from total printed amount storage 63 (FIG. 16B) (step S402). Limit amount management unit 62 obtains the limit amount "10" corresponding to the PIN of "0" from limit amount storage 61 (FIG. 15) (step S402). The total printed amount and the limit amount obtained are sent to server controller 68.

Server controller 68 informs setting unit 65 of PIN "0", PC name "PC0", and total printed amount "10" and limit amount "10". Comparison determination unit 66 of setting unit 65 compares the total printed amount and the limit amount and determines whether or not the total printed amount is equal to or greater than the limit amount (step S308).

Upon determining that the total printed amount is equal to or greater than the limit amount by comparing total printed amount "10" and limit amount "10" (step S308), comparison determination unit 66 informs execution unit 67 of the corresponding PIN and PC name (which is PIN "0" and PC name "PC0"). Execution unit 67 sets and stores therein the received PIN and PC name as the prohibited PIN and PC name (step S403).

Next, setting unit 65 notifies server controller 68 of the completion of the comparison determination process for PIN "0" and PC name "PC0". Next, server controller 68 determines whether a next pair of PIN and PC name exists.

As described above, corresponding to each pair of PIN and PC name registered in server 52, the total printed amount and the limit amount are obtained and the comparison determination process is executed. When it is determined that the total printed amount for either the PIN or the PC name is equal to or greater than the limit amount, the PIN and the PC name are set and stored as a prohibited PIN and a prohibited PC name.

When a next pair of PIN and PC name is not registered (step S404), server controller 68 instructs setting unit 65 to executes an OFF setting (step S311).

Next, when any prohibited PIN and prohibited PC name are stored (step S405), execution unit 67 of setting unit 65 creates the OFF setting command data and transmits it to server controller 68 based on the OFF setting instruction in order to set the permission information for the prohibited PIN and PC name to "OFF" (step S406).

Next, server transmission unit 32 transmits the OFF setting command data to printer 51 (step S315).

In printer 51, printer reception unit 19 receives the OFF setting command data from server 52 and then analyzing unit 21 analyses the received data and determines that the received data is command data (step S316).

Next, job management unit 24 creates the OFF setting job command (step S317) and transmits the OFF setting job command to user information management unit 54 via printer controller 60.

User information management unit 54 updates user information storage 53 based on the OFF setting job command and sets the permission information for the prohibited PIN and PC name to "OFF" (step S407).

Before the update, permission information "ON" is stored corresponding to PIN "0" and PC name "-" and no permission information is stored corresponding to PIN "0" and PC name "PC0" in user information storage 53 as shown in FIG. 13A. User information management unit 59 creates and stores a new PC name of "PC0" corresponding to PIN "0" in user information storage 53 in order to set the permission information corresponding to PIN "0" and PC name "PC0" and then stores "OFF" in the permission corresponding to PC name "PC0".

As shown in FIG. 13C, corresponding to PIN "0" and PC name "PC0", permission information "OFF" is stored in user information storage 53. Thus, the OFF setting process in print system 50 ends.

In step S405, when it is determined that no prohibited PIN and no prohibited PC name exist, execution unit 67 informs server controller 68 of the determination result. Thus, the OFF setting process in print system 50 ends.

As described above, for a PIN and a PC name whose total printed amount reaches its limit amount, permission information "OFF" is set in printer 51. This prohibits the PIN and PC name from printing using printer 51.

Note that the total printed amounts stored in total printed amount storage 63 of server 52 are reset to "0" in an accounting process executed at predetermined time intervals, for example. Also, permission information "OFF" set in printer 51 is changed to "ON" at this reset process.

Next, in printer 51, the flow of process when receiving print data will be described with reference to FIGS. 19 and 20.

Figure 19:
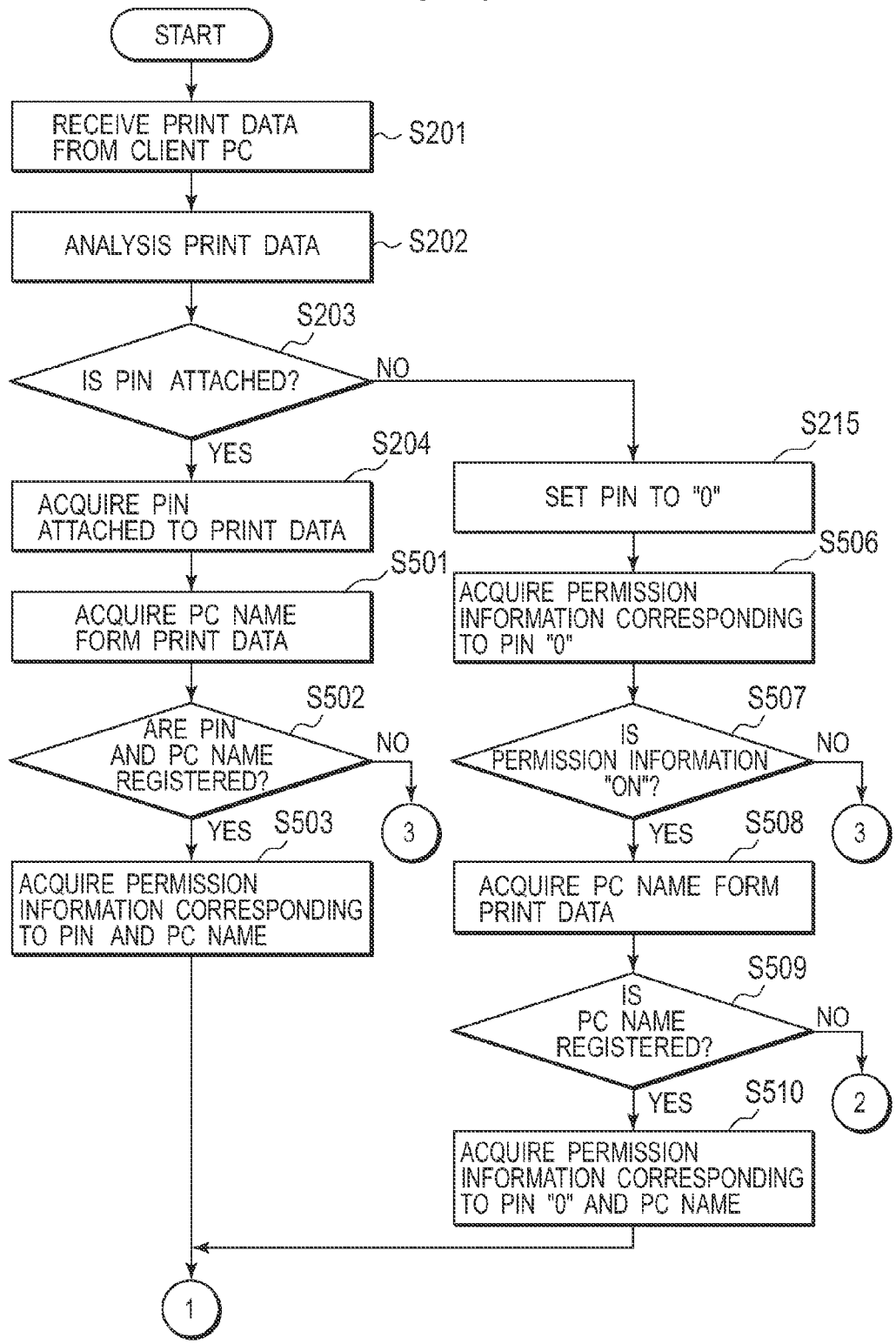
FIG. 19 is a flow chart (No. 1) showing a printing operation of a printer according to the second embodiment of the invention.
Figure 20:
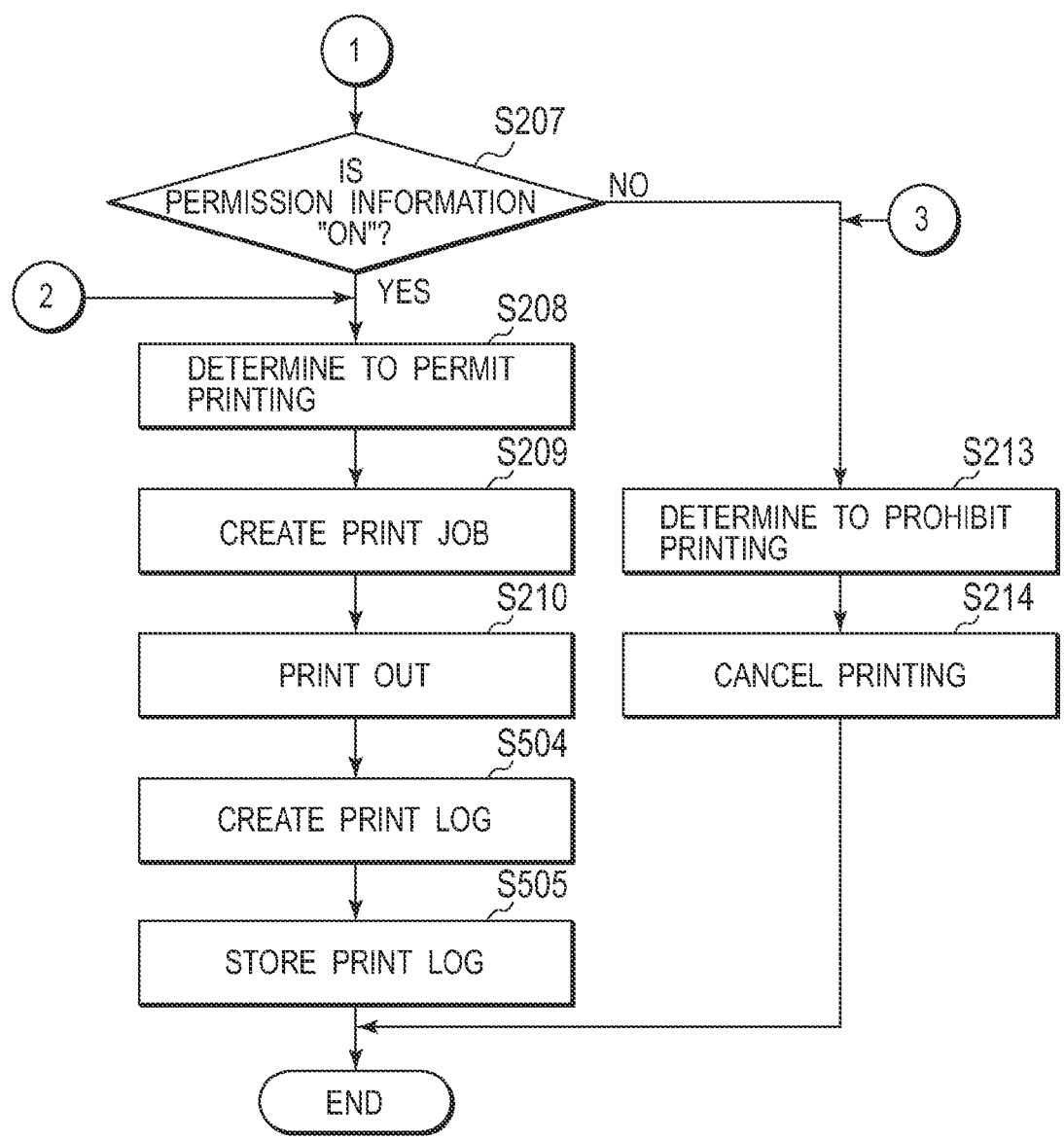
FIG. 20 is a flow chart (No. 2) showing the printing operation of the printer according to the second embodiment of the invention.

FIG. 19 is a first flow chart (No. 1) showing the printing operation of a printer of the second embodiment according to the invention, and FIG. 20 is a second flow chart (No. 2) showing more of the printing operation of the printer of the second embodiment.

First, the flow in a case where printer 51 receives print data from client PC 14 of registered PIN and PC name will be described.

Client PC 14 attached a registered PIN to print data including image data and its PC name and transmits it to printer 51.

In printer 51, printer reception unit 19 receives the print data from client PC 14 (step S201).

Next, analyzing unit 21 analyses the received data and determines that the received data is print data (step S202), and then first judging unit 22 determines whether a PIN is attached to the print data (step S203).

If it is determined that the PIN is attached to the print data (step S203), first judging unit 22 obtains the PIN (step S204).

Also, acquisition unit 55 obtains the PC name from the print data based on input from printer controller 60 (step S501).

Next, printer controller 60 transmits a permission information acquisition job command and the PIN and the PC name to user information management unit 54.

User information management unit 54 determines whether the received PIN and PC name are registered in user information storage 53 (step S502). If it is determined that they are registered, user information management unit 54 obtains its permission information corresponding to the PIN and PC name (step S503).

Next, second judging unit 23 determines, based on the permission information, whether printing is to be permitted (step S207).

If the permission information is "ON" (step S207), second judging unit 23 determines that printing is permitted (step S208).

Job management unit 24 then creates a print job based on the print data and transmits it to print controller 25 (step S209). Print controller 25 creates page data based on the print job and transmits it to engine unit 26.

Next, engine unit 26 executes printing based on the page data (step S210) and then transmits the completion of the printing to print controller 25.

Print controller 25 informs job management unit 24 of its print result including its printed amount (the number of printed sheets). Job management unit 24 transmits the log creation job command to generation unit 27.

Next, generation unit 27 creates a print log including the PIN, the PC name, and the printed amount (step S504). Print log management unit 59 receives a log storage job command and the print log from printer controller 60 and stores the print log in print log storage 58 (step S505). Thus, the printing process in printer 51 ends.

If the permission information is "OFF" in step S207, second judging unit 23 determines that printing is prohibited (step S213). Printer controller 60 informs job management unit 24 of cancelation of the printing, and job management unit 24 cancels the printing (step S214). Thus, the printing process in printer 51 ends.

If it is determined that a pair of PIN and PC name is not registered in step S502 after it is determined that a PIN is attached in step S203, printer 51 determines that printing is prohibited (step S213) and cancels the printing (step S214).

As described above, the PIN and the PC name are obtained from the print data, and it is determined whether the printing is permitted or not.

Next, the flow in a case where print data of ten sheets received from client PC 15 used by an unregistered user and whose PC name is "PC0" will be described.

In printer 51, when printer reception unit 19 receives the print data from client PC 15 (step S201), analyzing unit 21 analyses the received data and determines that the received data is print data (step S202). Next, first judging unit 22 determines whether a PIN is attached to the print data (step S203).

If determining that no PIN is attached to the print data (step S203), first judging unit 22 obtains PIN "0" and informs printer controller 60 of it (step S215).

Next, printer controller 60 transmits a permission information acquisition job command and PIN "0" to user information management unit 54. User information management unit 54 then obtains permission information for PIN "0" and PC name "-" from user information storage 53 (step S506). In user information storage 53 shown in FIGS. 13B and 13C, the permission information of "ON" is stored corresponding to PIN "0" and PC name "-". User information management unit 59 obtains this permission information of "ON" and informs printer controller 60 of it.

Next, second judging unit 23 determines whether the obtained permission information is "ON" or "OFF" (step S507).

If the permission information is "ON" (step S507), second judging unit 23 informs printer controller 60 of the determination result. Next, acquisition unit 55 obtains the PC name from the print data based on input from printer controller 60 (step S508). Acquisition unit 55 obtains the PC name of "PC0" and informs printer controller 60 of it.

Printer controller 60 then transmits a permission information acquisition job command, PIN "0", and PC name "PC0" to user information management unit 54. User information management unit 54 determines whether the received PC name of "PC0" corresponding to PIN "0" is registered or not in user information storage 53 (step S509).

In user information storage 53 shown in FIGS. 13B and 13C, the informed PC name of "PC0" is registered corresponding to PIN "0" (step S509). Then, user information management unit 54 obtains the permission information corresponding to PIN "0" and PC name "PC0" (step S510).

Next, second judging unit 23 determines whether the printing is permitted or prohibited, based on the permission information (step S207).

For example, in a case where the permission information corresponding to PIN "0" and PC name "PC0" is obtained from user information storage 53 of FIG. 13B (step S510), the permission information is "ON" (step S207), and then second judging unit 23 determines that the printing is permitted (step S208).

Next, job management unit 24 creates a print job based on the print data and transmits it to print controller 25 (step S209). Print controller 25 creates page data of ten sheets based on the print data and transmits it to engine unit 26.

Next, engine unit 26 executes printing based on the page data (step S210) and then informs print controller 25 of the completion notification.

Print controller 25 informs job management unit 24 of the print result including the printed amount of "10". Job management unit 29 transmits the log creation command job to generation unit 57.

Next, generation unit 27 creates a print log including PIN "0", PC name "PC0" and printed amount "10" (step S509). Print log management unit 59 then receives a log storage command job and the print log from printer controller 60 and stores the print log to print log storage 58 (step S505). Thus, the printing process in printer 51 ends.

As shown in FIG. 14, the print log including PIN "0", PC name "PC0" and printed amount "10" is stored in print log storage 58.

If permission information corresponding to PIN "0" and PC name "PC0" is obtained from user information storage 53 of FIG. 13C in step S510, the permission information is "OFF" (step S207) and second judging unit 23 thus determines that printing is prohibited (step S213).

Then printer controller 60 informs job management unit 24 of cancelation of the printing and job management unit 24 cancels the printing (step S219). Thus, the printing process in printer 51 ends.

As described above, if no PIN is attached to the print data and permission information that is set for unregistered users is "ON", its PC name is obtained from the print data, and it is determined based on the permission information that is set for the PC name that the printing is permitted or prohibited.

If permission information corresponding to PIN "0" and PC name "-" is "OFF" in step S507, second judging unit 23 determines that the printing is prohibited (step S213).

Then, printer controller 60 informs job management unit 24 of cancelation of the printing and job management unit 24 cancels the printing (step S219). Thus the printing process in printer 51 ends.

As described above, if no PIN is attached to the print data and the permission information is set for unregistered users is "OFF", printer 51 cancels the printing without obtaining its PC name from the print data.

As described above, in the print system of the embodiment, the limit amount is set for each PIN and the permission information is set for each PC name. Therefore, even if plural non-internal users want to temporarily use the printer, each non-internal user is able to print within the set limit amount. Consequently, the embodiment further improves convenience.

Although an image forming apparatus according to the invention is adapted to a printer in the above described embodiments, the image forming apparatus according to the invention is not limited to this. For example, the image forming apparatus according to the invention can be adopted to any type of image forming apparatus such as a scanner, facsimile machine, copy machine, MFP (Multi-Function Peripheral or Multi-Function Printer), or the like.

Although user identification information is a PIN comprised of one to three digits in the above described embodiment, the invention is not limited to this. For example, the user identification information may be password comprising number(s) and code(s) or the like.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. An image forming apparatus comprising:
a reception unit operable to receive image data from information processing apparatus used by users including registered users and unregistered users;
an image forming unit configured to form images based on the image data;
a generation unit operable to generate history information relating to an execution history of the image forming unit;
a first storage operable to store the history information and user identification information corresponding to the history information;
a second storage operable to store limit information about each user for limiting the execution of image forming by the image forming unit;
a setting unit operable to set permission information for each user based on the history information and the limit information, the permission information showing whether or not to permit the execution of image forming by the image forming unit;
a first judging unit operable to determine whether the user identification information is attached to the image data when receiving the image data from the reception unit;
a second judging unit operable to determine, based on the permission information that is set for an unregistered user, whether or not to permit execution of image forming of the image data, when the first judging unit determines that the user identification information is not attached to the image data; and
a controller operable to instruct the image forming unit to execute image forming of the image data, when the second judging unit determines to permit execution of image forming of the image data.

2. The image forming apparatus according to claim 1, wherein
the controller is operable to instruct the generation unit to generate the history information and to store in the first storage the generated history information with the user identification information of the unregistered user corresponding to the generated history information.

3. The image forming apparatus according to claim 1, wherein
when the first judging unit determines that the user identification information is attached to the image data, the second judging unit determines, based on the permission information that is set for the user identification of a registered user, whether or not to permit execution of image forming of the image data.

4. The image forming apparatus according to claim 1, wherein
the second storage is operable to store therein the limit information corresponding to each of the user identification information of a registered user and the user identification information of the unregistered user, and
the setting unit is operable to set the permission information based on the history information and the limit information for each of the registered user and the unregistered user identification information.

5. The image forming apparatus according to claim 4, wherein
the user identification information of the each of the registered user and the unregistered user is a PIN (Personal Identification Number).

6. The image forming apparatus according to claim 1, wherein
the history information includes a number of image-formed sheets,
the limit information includes an upper limit of the number of image-formed sheets,
the setting unit includes:
a comparison determination unit operable to compare the number of image-formed sheets and the upper limit and to determine whether the number of image-formed sheets is less than the upper limit, for each user, and an execution unit operable to set, when the comparison determination determines that the number of image-formed sheets is not less than the upper limit, the permission information as a prohibition of execution of the image forming.

7. The image forming apparatus according to claim 1, wherein the image data includes apparatus identification information of the information processing apparatus, the image forming apparatus further comprises:

an acquisition unit operable to acquire the apparatus identification information from the image data, when the first judging unit determines that no user identification information is attached the image data and the second judging unit determines to permit execution of image forming of the image data; wherein the controller stores the history information with the acquired apparatus identification information in the first storage, and the setting unit sets the permission information of the unregistered user corresponding to the apparatus identification information.

8. The image forming apparatus according to claim 7, wherein when the acquisition unit acquires the apparatus identification information, the second judging unit determines, based on the permission information corresponding to the apparatus identification information, whether or not to permit execution of image forming of the image data.

9. The image forming apparatus according to claim 7, wherein when the first judging unit determines that the user identification information is attached to the image data, the acquisition unit acquires the apparatus identification information from the image data and the second judging unit determines, based on the permission information corresponding to the apparatus identification information, whether or not to permit execution of image forming of the image data.

10. The image forming apparatus according to claim 7, wherein the apparatus identification information is a name of the information processing apparatus.

11. The image forming apparatus according to claim 7, wherein the apparatus identification information is a user name of the user using the information processing apparatus.

12. An image forming system, comprising:

an image forming apparatus including:

a reception unit operable to receive image data from information processing apparatus used by users including registered users and unregistered users;

an image forming unit configured to form images based on the image data; and a generation unit operable to generate history information relating to an execution history of the image forming unit, a server including:

a server acquisition unit communicatable with the image forming apparatus and operable to acquire user identification information and the history information from the image forming apparatus;

a first storage operable to store the history information and the user identification information corresponding to the history information;

a second storage operable to store limit information of each user for limiting the execution of the image forming of the image forming apparatus; and a setting unit operable to set in the image forming apparatus permission information for each user based on the history information and the limit information, the permission information showing whether or not to permit the execution of the image forming of the image forming apparatus, wherein the image forming apparatus further comprises:

a first judging unit operable to determine whether the user identification information is attached to the image data when receiving the image data from the reception unit;

a second judging unit operable to determine, based on the permission information that is set for an unregistered user, whether or not to permit execution of image forming of the image data, when the first judging unit determines that the user identification information is not attached to the image data; and a controller operable to instruct the image forming unit to execute the image forming of the image data, when the second judging unit determines to permit execution of image forming of the image data.

13. An image forming system according to claim 12, wherein the controller is operable to instruct the generation unit to generate the history information, the server acquisition unit is operable to acquire the generated history information, and the first storage is operable to store therein the acquired history information with the user identification information of the unregistered user corresponding to the generated history information.

14. An image forming system according to claim 12, wherein when the first judging unit determines that the user identification information is attached to the image data, the second judging unit determines, based on the permission information that is set for the user identification of an registered user, whether or not to permit execution of image forming of the image data.

15. An image forming system according to claim 12, wherein the second storage is operable to store therein the limit information corresponding to each of the user identification information of the registered user and the user identification information of the unregistered user, and the setting unit is operable to set the permission information based on the history information and the limit information corresponding to each of the user identification information of the registered user and the user identification information of the unregistered user.

16. An image forming system according to claim 12, wherein the history information includes a number of image-formed sheets, the limit information includes an upper limit of the number of image-formed sheets, the setting unit includes:

a comparison determination unit operable to compare the number of image-formed sheets and the upper limit for each user and to determine whether the number of image-formed sheets is less than the upper limit, an execution unit operable to set, when the comparison determination determines that the number of image-formed sheets is not less than the upper limit, the permission information as a prohibition of execution of the image forming.

17. An image forming system according to claim 12, wherein
the image data includes an apparatus identification information of the information processing apparatus,
the image forming apparatus further comprises:
an apparatus acquisition unit operable to acquire the apparatus identification information from the image data, when the first judging unit determines that no user identification information is attached the image data and the second judging unit determines to permit execution of image forming of the image data; wherein
the server acquisition unit acquires the acquired apparatus identification information from the image forming apparatus,
the first storage stores therein the acquired apparatus identification information with the history information,
the setting unit sets the permission information of the unregistered user corresponding to the apparatus identification information.

18. An image forming system according to claim 17, wherein
when the apparatus acquisition unit acquires the apparatus identification information, the second judging unit determines, based on the permission information corresponding to the apparatus identification information, whether or not to permit execution of image forming of the image data.

19. An image forming system according to claim 17, wherein
when the first judging unit determines that the user identification information is attached to the image data, the apparatus acquisition unit acquires the apparatus identification information from the image data and the second judging unit determines, based on the permission information corresponding to the apparatus identification information, whether or not to permit to execute image forming of the image data.

20. An image forming system according to claim 13, wherein
the user identification information of the each of the registered user and the unregistered user is a PIN (Personal Identification Number).

* * * * *